US005784358A

United States Patent [19]
Smith et al.

[11] Patent Number: 5,784,358
[45] Date of Patent: Jul. 21, 1998

[54] BROADBAND SWITCHING NETWORK WITH AUTOMATIC BANDWIDTH ALLOCATION IN RESPONSE TO DATA CELL DETECTION

[75] Inventors: Avail Joy Smith, Oxfordshire; John Leonard Adams, Suffolk, both of United Kingdom

[73] Assignees: Oxford Brookes University, Oxford; British Telecommunications public limited company, London, both of United Kingdom

[21] Appl. No.: 619,653

[22] PCT Filed: Mar. 8, 1995

[86] PCT No.: PCT/GB95/00502

§ 371 Date: Mar. 22, 1996

§ 102(e) Date: Mar. 22, 1996

[87] PCT Pub. No.: WO95/24812

PCT Pub. Date: Sep. 14, 1995

Related U.S. Application Data

[63] Continuation-in-part of Ser. No. 255,311, Jun. 3, 1994, Pat. No. 5,504,744.

[30] Foreign Application Priority Data

Mar. 9, 1994 [EP] European Pat. Off. ............ 94301673

[51] Int. Cl.[6] ..................................... H04Q 11/04
[52] U.S. Cl. ..................... 370/230; 370/395; 370/468
[58] Field of Search ........................... 370/229, 230, 370/232, 233, 234, 395–399, 468

[56] References Cited

U.S. PATENT DOCUMENTS

| | | | |
|---|---|---|---|
| 5,271,005 | 12/1993 | Takase et al. | 370/79 |
| 5,289,462 | 2/1994 | Ahmadi et al. | 370/60.1 |
| 5,291,481 | 3/1994 | Doshi et al. | 370/60.1 |
| 5,313,454 | 5/1994 | Bustini et al. | 370/13 |
| 5,315,586 | 5/1994 | Charvillat | 370/60 |
| 5,377,327 | 12/1994 | Jain et al. | 395/200 |

FOREIGN PATENT DOCUMENTS

0452223 A2  10/1991  European Pat. Off.

OTHER PUBLICATIONS

Crocetti et al, IEEE Infocom '91, vol. 3,7 Apr. 1991, Bal Harbour, pp. 1145–1150 "Bandwidth Advertising for MAN/ATM Connectionless Internetting".

Saito et al, Transactions of the Institute of Electronics, Information and Communications Engineers, vol. E74, No. 4, Apr. 1991, Tokyo, pp. 761–771, "Traffic Control Technologies in ATM Networks".

Tranchier et al, International Switching Symposium, vol. 2, Oct. 1992, Yokohama, pp. 7–11, "Fast Bandwidth Allocation in ATM Networks".

Chao et al, International Switching Symposium, vol. 1, 25 & 30 Oct. 1992, Yokohama, pp. 1229–1233, "A General Architecture for Link–Layer Congesion Control in ATM Networks".

*Primary Examiner*—Douglas W. Olms
*Assistant Examiner*—Matthew C. Phillips
*Attorney, Agent, or Firm*—Nixon & Vanderhye P.C.

[57] ABSTRACT

A broadband switching system and method switches asynchronously transferred cells of data using a dynamic bandwidth controller to control application of data cells from a number of transmitting end systems to an input port of the system. The dynamic bandwidth controller provides cell buffering from each source and controls output of data cells to the system according to a current cell rate assigned to cells from the respective end system. When an end system begins transmitting data cells, the controller detects the presence of incoming cells and requests bandwidth from a connection admission control forming part of the system. A default cell rate is provided for the end system so that transmission can continue until an appropriate bandwidth is allocated. The controller contains a buffer for buffering cells in this situation. Once appropriate bandwidth has been allocated, cell rate advice information from the connection admission control is fed back to the data bandwidth controller and thence to the transmitting end system to prevent transmission of cells at too high a rate for the available bandwidth.

41 Claims, 13 Drawing Sheets

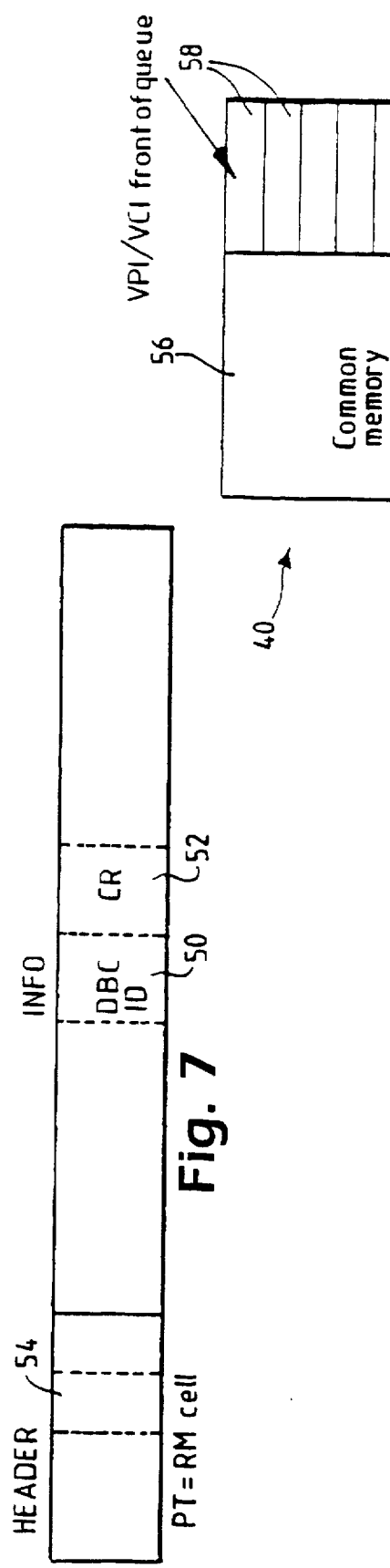
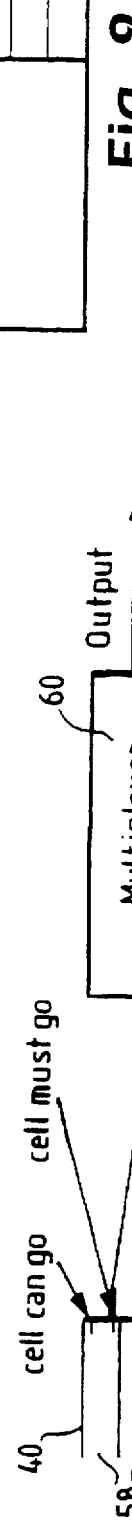

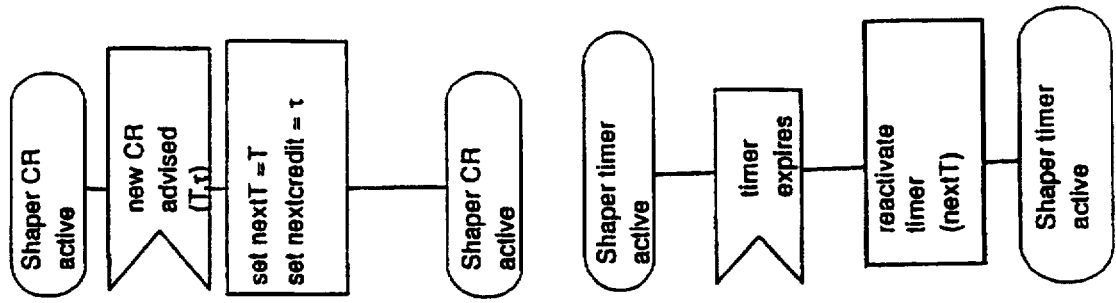
Fig. 12-2F
Fig. 12-2G
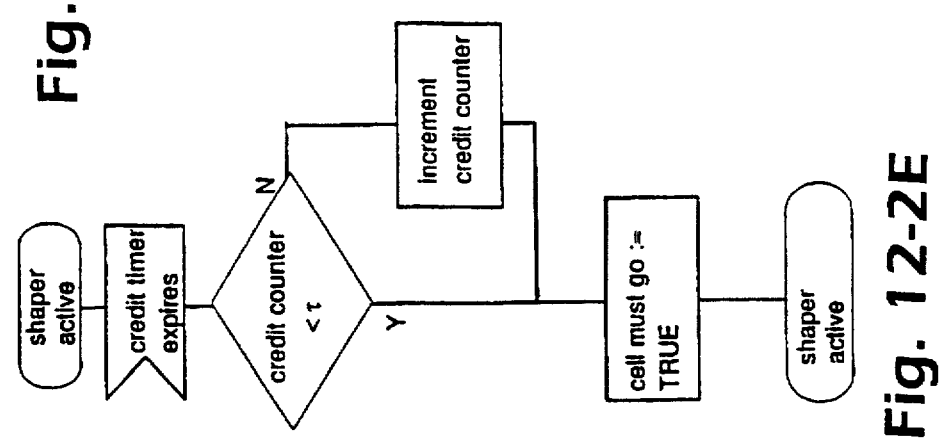
Fig. 12-2E
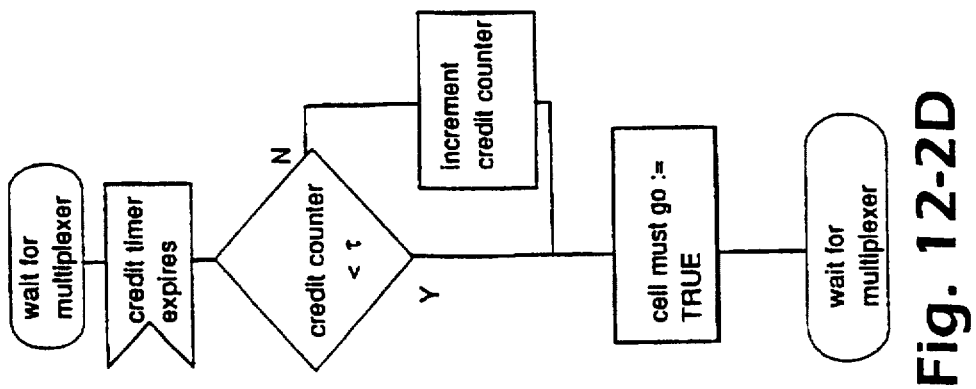
Fig. 12-2D

BROADBAND SWITCHING NETWORK WITH AUTOMATIC BANDWIDTH ALLOCATION IN RESPONSE TO DATA CELL DETECTION

CROSS-REFERENCE TO RELATED APPLICATION

This application is a continuation-in-part of our commonly assigned application Ser. No. 08/255,311 filed Jun. 3, 1994, now U.S. Pat. No. 5,504,744.

BACKGROUND OF THE INVENTION

1. Field of the Invention

This invention relates to a broadband switching network for the switching of asynchronously transferred data cells, and to a method of switching asynchronously transmitted data cells.

2. Related Art

Broadband switching networks for switching asynchronously transferred cells are known, in which a predetermined level of bandwidth is allocated to a transmission channel connecting a first customer to a second customer. In some of these known systems, a communications channel is provided over a significant period of time, effectively of the leased-line type, and manual measures are implemented in order to set up such a connection or to modify a connection according to the particular terminations and the level of traffic being conveyed. Consequently, it is usual for customers to incur a fixed rate charge as part of the overall charge for the connection, resulting in payment being made irrespective as to whether the connection is being used or not.

Alternative systems have been proposed or are available. In particular, it is possible for connections to be established on a dial-up basis, requiring termination equipment to be provided with facilities for establishing connections by issuing signalling commands and responding to similar commands issued by the network.

The use of permanent circuits to support a private communications network is widespread. The demand for such circuits is expected to grow to include broadband rates above 2 Mbit/s, the circuits carrying traffic multiplexed from sources which are inherently bursty, possibly together with traffic which is transmitted at constant bit rates and is delay sensitive, such as voice transmission and constant bit-rate video.

Asynchronous transfer mode (ATM) cells all have a fixed information field of forty eight octets which can carry customer traffic or customer-originating control information (signalling). These two types of data transmission are distinguished by setting virtual path (VP) and vertical circuit (VC) values in the cell headers. Another field provided in the ATM header is known as cell loss priority, which enables low priority cells to be distinguished from high priority cells. In the event of congestion, the low priority cells may be discarded first.

For private circuits within an ATM based network, the desired route, the required bandwidth, and the quality of service (QOS) are set up using network management procedures. The private circuits are known as permanent virtual circuits (PVCs) because there is no actual physical circuit, only a VP/VC value or "label" which is associated with information stored in the switches to determine the route and preserve the bandwidth and QOS requirements.

A disadvantage of all known permanent circuits is that the bandwidth remains assigned to the circuit, even when the customer has nothing to transmit. This means that the customer may have to pay higher charges than would be obtained if the bandwidth was only made available when needed. The assumption being made here is that charging is related to reserved bandwidth, and this is not necessarily correct in terms of the way public network operators may choose to charge for virtual circuits. However, it is expected that charging based on reserved bandwidth will become a significant factor in the future.

A common practice is to set up a permanent virtual circuit so that it is only available during certain hours of the day, or during certain days of the week. A difficulty with this approach is that it does not allow the customer to change the pattern of usage quickly, and it may only crudely reflect the usage required by the customer.

A second proposal has been to provide the customer with a separate communications channel to the network management plane, thereby allowing a permanent virtual circuit to be reconfigured. A difficulty with this approach is that some time delay will be incurred before the customer can start to use the virtual circuit.

A third proposal is to introduce equipment at every switching point in the network that recognises a fast resource management cell, indicating that bandwidth should now be assigned to the circuit. A difficulty with this approach is that there is no internationally agreed standard for a bandwidth-requesting cell that would be recognised by the switching equipment produced by the various manufacturers.

SUMMARY OF THE INVENTION

According to a first aspect of this invention, a broadband switching system having at least one ingress for connection to a respective signal source and at least one egress for connection to a selected signal receiving system has at least one switch for transmitting information-carrying asynchronously transferred data cells from the ingress to the egress, system control means for accepting and establishing a connection between the ingress and the egress via the said switch, and bandwidth control means arranged to detect the said information-carrying data cells received at the ingress and, automatically in response to such cell detection, to cause the system control means to allocate bandwidth for the transmission of the cells to the egress. In this way it is possible to alter the bandwidth available in the system for cells intended for a given path dynamically in response to the detected usage level, avoiding the need to signal a request for bandwidth prior to being able to transmit cells onto the system. It is also possible to avoid the situation of bandwidth remaining assigned to a virtual circuit even when the customer has nothing to transmit.

Preferably, the bandwidth control means include a transmission limiter having storage means for storing a maximum output cell rate value derived from a control signal received by the limiter from the system control means, and means for limiting the transmission of cells to the said switch when the rate at which cells are received at the ingress exceeds the maximum output cell rate value. The limiter may include a buffer for delaying transmission of the cells to the switch.

The bandwidth control means may include feedback means arranged to transmit the maximum output cell rate (CR) value to the ingress for transmission to a signal source generating the data cells. The maximum output cell rate value indicates a cell rate which depends on or matches the allocated bandwidth and preferably forms part of a resource management (RM) cell. Thus, the rate at which data is fed to the ingress by the source can be controlled in a situation in which the bandwidth allocated depends on the bandwidth available in the switching system.

In the case of the bandwidth control means operating on data cells from a number of signal sources, the transmission limiter may be operable to transmit cells from one of the sources at a rate which is dependent on the number of cells stored by the device and received from one or more of the other signal sources. Thus, the bandwidth available to signals outputted from the bandwidth control means may be shared between cells from different signal sources, especially if several transmissions having different route identifiers are bursting simultaneously. This can be achieved by flagging cells which have been buffered for longer than a predetermined period so as to give such cells a higher priority in a polling operation.

The bandwidth control means may include, in addition, a cell monitoring stage operable to read routing identifiers associated with cells arriving from different signal sources and to update activity status values associated with the routing identifiers, the transmission of an activity status value relating to a particular identifier from an active to an inactive status causing the system control means to allocate bandwidth for cells associated with that identifier.

Preferably, the bandwidth control means are arranged to detect the rate at which cells are supplied to the ingress and bandwidth is requested from the system control means generally on the basis that the transmitting signal source should be allocated as much bandwidth as is available in the system for the indicated route. Such bandwidth will be allocated depending on the level of traffic in the system at the time the system control means is caused to allocate bandwidth. However, in the preferred embodiment of the invention, the rate at which cells are supplied to the ingress from a given signal source is monitored and, if the allocated bandwidth is more than that required to transmit the cells at the monitored rate, the system control means are caused by the bandwidth control means to allocate less bandwidth to these cells, e.g. after a predetermined time interval, thereby making bandwidth available to other customers.

The bandwidth control means may also be arranged to read a bandwidth-identifying portion of an incoming cell, and to cause the system control means to allocate bandwidth to the cell according to the identified bandwidth. The bandwidth control means may also be arranged to limit the rate of which incoming cells are accepted onto the network on the basis of a default bandwidth until allocation of bandwidth by the system control means has occurred.

Buffering which may be provided in the bandwidth control means for buffering cells while bandwidth is being allocated may be used on other occasions when a signal source is transmitting at a higher rate than the rate capable of being accepted by the network at a given time. Indeed, it is preferable for the buffer to have means for detecting when it is filled to a predetermined threshold level, the feedback means being responsive to the buffer to cause a retransmission of a cell rate indicator signal to the signal source when connected to the ingress. Preferably, detection of filling of the buffer to a predetermined threshold level causes a reduced cell rate indicator signal to be transmitted to the signal source, the signal source having the facility then to reduce its cell rate to avoid buffer overflow and consequent loss of data.

The bandwidth control means may include a cell counter for counting cells received from respective signal sources coupled to the bandwidth control means, thereby to generate charging signals for customer billing and for other purposes. This counter may be part of an activity detector associated with a controller in the bandwidth control means, the activity detector being operable to detect incoming cells and identify the signal source transmitting the detected cells, with the controller being operable in response to the detection and identification to transmit a bandwidth request message to the system control means to allocate a level of bandwidth specifically to the cells transmitted by the identified signal source.

The system control means may include means for identifying available bandwidth in the system for the said allocation of bandwidth, the bandwidth control means including means operable to receive from the identifying means a control signal representing the available bandwidth. It is possible for the system to re-allocate bandwidth from other existing connections in the system when the bandwidth control means requests bandwidth to be made available. Allocated bandwidth may be reduced during transmission of cells by congestion being sensed and a congestion signal being transmitted to the bandwidth control means which, in turn, causes a feedback signal or "reduce traffic level" instruction to be sent to the ingress for causing a reduction in the input signal rate from a respective signal source.

According to another aspect of the invention, there is provided a method of operating a broadband switching system for transmitting information-carrying asynchronously transferred data cells from an ingress of the system to an egress of the system via at least one switch, the method comprising controlling the bandwidth for transmitting the cells by detecting the cells and, automatically in response to the detection, causing system control means of the system to allocate bandwidth for transmission of the cells from the ingress to the egress.

According to a further aspect, the invention includes the use, in a broadband switching system for the transmission of information-carrying asynchronously transferred data cells from an ingress of the system to an egress of the system, of bandwidth control means arranged to detect incoming cells received at the ingress and, automatically in response to such cell detection, to cause system control means of the system to allocate bandwidth for the transmission of the cells to the egress.

According to yet a further aspect of the invention, there is provided a dynamic bandwidth controller for a broadband switching system which is for transmitting information-carrying asynchronously transferred data cells from an ingress of the system to an egress of the system via at least one switch, wherein the controller comprises means for detecting the said cells received at the ingress, and means for issuing a bandwidth request signal automatically in response to such cell detection to cause bandwidth to be allocated in the system for the transmission of the cells to the egress.

It is known to provide usage control means or so-called usage parameter controls (UPC) to downgrade the priority of cells or to discard cells according to priority designations as a means of controlling the application of traffic from an end system to the network. Where such usage control means are present, the bandwidth control means may provide signals for the usage control means in response to the allocation of bandwidth by increasing a first predetermined threshold level at which the usage control means downgrades the priority of transmitted cells.

In the preferred embodiment of the invention, the first predetermined level of the usage control means is set to zero when no actual use is being made of the network by the end system, resulting in initial cells being downgraded to low priority. Indeed, after a time-out period of the bandwidth control means having been exceeded with a particular end system having transmitted no data cells, the bandwidth allocated to that end system is reduced to zero.

Preferably, the bandwidth control means adjusts the first predetermined level set by the usage control means by transmitting a message to the system control means, which in turn issues a message to the usage control means.

The present invention also provides a method of asynchronously transmitting cells of data through a switchable network, the method comprising the steps of resetting a usage control means so as to downgrade the priority of input cells; detecting the presence of input cells requiring a level of bandwidth through the network; and requesting a switch control to allocate bandwidth in response to said detection; whereupon bandwidth is allocated by the switch control; and the usage control means is adjusted by the switch control so that high priority cells are maintained as such.

In a preferred embodiment, a request may be made to the switch control to provide as much bandwidth as is available (typically up to the maximum transmission rate capacity of the transmitting end system), whereupon the switch control identifies the available bandwidth; the bandwidth is allocated and buffer space is provided, and a feedback signal is generated, which is repeated if the level of data retained in said buffer exceeds a predetermined value.

BRIEF DESCRIPTION OF THE DRAWINGS

The invention will now be described in greater detail by way of example with reference to the accompanying drawings in which:

FIG. 7 is a diagram of a resource management (RM) data cell;

FIG. 9 is a diagram of a buffer for the bandwidth controller of FIG. 4;

FIG. 11 is a block diagram of a shaper/multiplexer module and its connection to the buffer of FIG. 6;

FIGS. 12-1A through, 12-1C, 12-2D through 12-2G and 12-3H are SDLs for the shaper/multiplexer module;

DETAILED DESCRIPTION OF EXEMPLARY EMBODIMENTS

In its preferred form, the invention is concerned with a broadband switching network which may form part of or may constitute a public switching network for the transmission of asynchronously transferred data cells between end systems.

Figure 1:
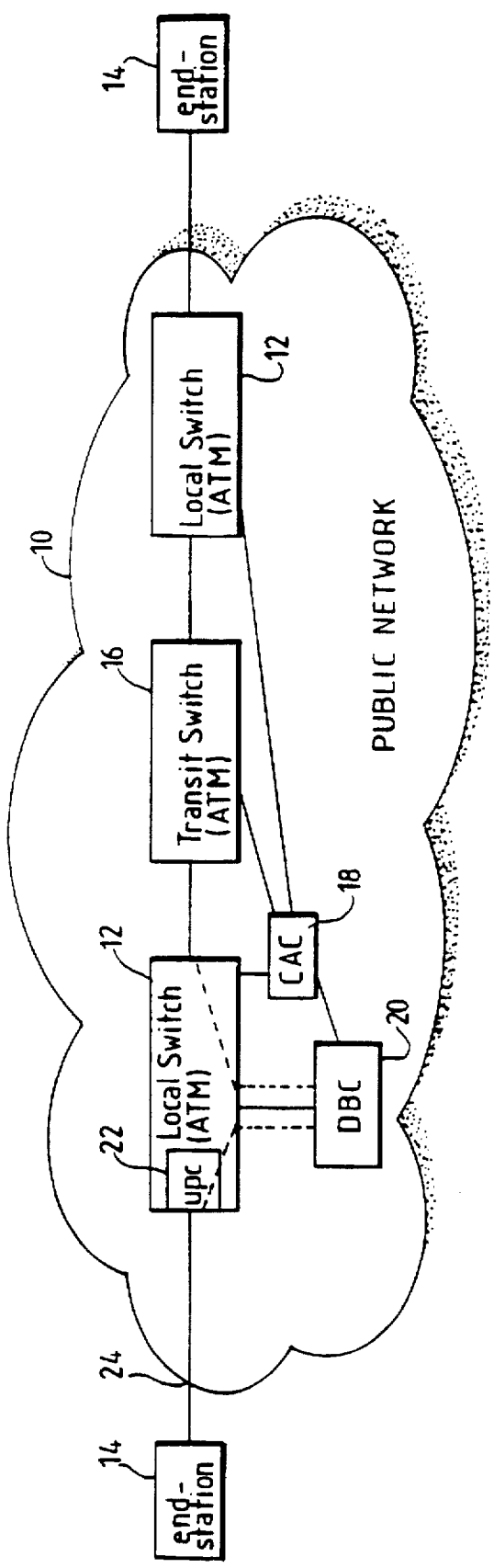
FIG. 1 is a diagram of a broadband switching network in accordance with the invention.

Referring to FIG. 1, the public network 10 has a plurality of switches operable in asynchronous transfer mode (ATM). In this simple example, the switches include two local switches 12 each having a port for connection to a respective end system 14, and a transit switch 16 interconnecting the local switches 12. Associated with the switches is a connection admission control function (CAC) 18 and a dynamic bandwidth controller (DBC) 20 for controlling traffic entering the network through one of the local switches 12. This switch 12 also includes a usage parameter control device 22 for dynamically altering the priority of data cells received at the input port 24 of the network from the end system 14.

It will be understood that, in practice, the network 10 will include large numbers of local and transit switches 12, 16 and several DBCs 20 all interconnected to form a network having a plurality of ports such as port 24 for connecting several end systems such as end system 14. Using the DBC 20, the public network 10 is able to provide an available bit rate (ABR) service, the DBC acting to detect incoming cells supplied to the input port 24 and, automatically in response to this detection, to cause the CAC 18 to allocate bandwidth for the transmission of the cells to the destination end system. Generally, end systems 14 requiring the ABR service are allocated to a fixed DBC 20. There may be more than one DBC 20 for each local ATM switch 12. In the case of a fault, end systems can be rerouted to a standby DBC (not shown).

Data is transmitted in the form of asynchronous transfer mode (ATM) cells, each having an information field of forty-eight octets, in addition to a header of five octets, which includes information facilitating transmission through the network itself. Thus, routing is controlled on a cell-by-cell basis and a plurality of transmission paths and time multiplexed slots may be employed for any particular link. ATM cells are, therefore, transmitted via virtual paths and virtual circuits, as defined by the header information.

The virtual paths and virtual circuits are identified by a virtual path identifier (VPI) and a virtual channel identifier (VCI) in the five octet header which effectively defines the connection between the end systems so that cells forming part of a common message will be transmitted over the same connection. ABR traffic enters the public network 10 by routing cells according to their VPIs and VCIs through the DBC 20 and then out to external routes, as shown in FIG. 1. From the DBC 20, the traffic on each virtual path and virtual channel is restricted to a cell rate (which will be referred to hereinafter as "CR"), determined by the CAC 18.

Figure 2:
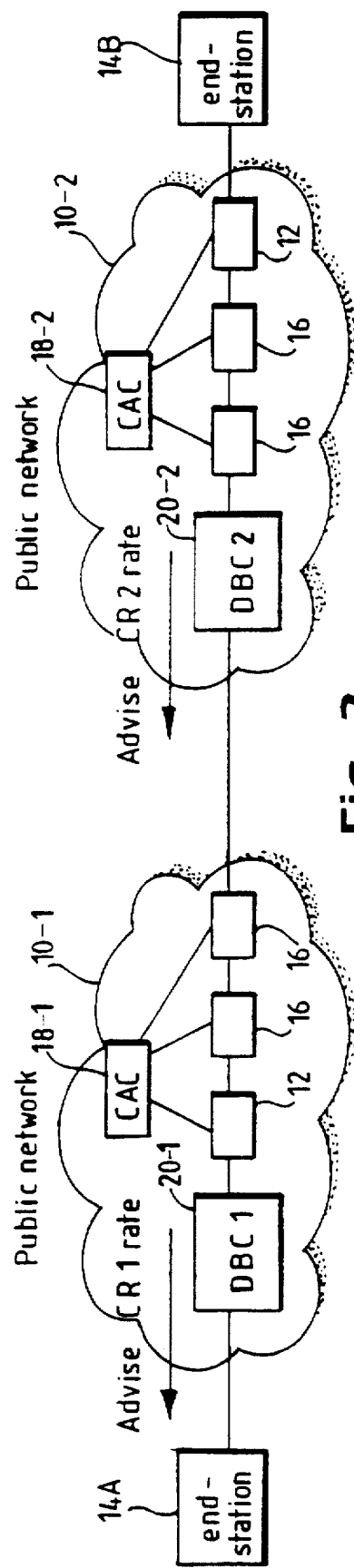
FIG. 2 is a diagram of another broadband switching network in accordance with the invention.

An alternative illustrative arrangement is shown in FIG. 2. In this case, end system 14A is subject to the control of more than one DBC. In fact, the connection between two end systems 14A, 14B is routed through two public networks 10-1 and 10-2. Each network 10-1, 10-2 has its own DBC 20-1, 20-2 responsible for restricting traffic entering the network according to the bandwidth allocated by its own connection admission control function (CAC) 18-1, 18-2. Each DBC 20-1, 20-2 is also responsible for advising the end system 14A of the current applicable CR.

In the systems of both FIG. 1 and FIG. 2, the DBCs 20, 20-1, 20-2 request bandwidth from the respective CAC 18, 18-1, 18-2 whilst buffering any incoming data cells which cannot immediately be transmitted to the respective switches 12, 16. The CAC 18, 18-1, 18-2 then allocates a bandwidth to the cells corresponding to the most narrowband circuit in the path identified by the VPI and VCI of the relevant cells. This allocation is then indicated to the DBC 20, 20-1, 20-2 which communicates a maximum CR to the transmitting end system. As a consequence, the impression is given that the network is permanently configured to make bandwidth available for data transmission, even when the user does not have a requirement to make use of the available bandwidth. However, as will become apparent hereinafter, the user need only be charged when making actual use of the network, preferably by charging on the basis of the number of cells transmitted over the logical link between end systems. Thus, prior to transmission being invoked by, say, user A, the network may actually allocate no bandwidth whatsoever for transmission between the relevant end systems. Furthermore, it is not necessary for any special control activity to be made by user A in order for bandwidth to be allocated. A level of bandwidth will be assigned to user A when required.

It is possible for a single dynamic bandwidth controller (DBC) to be shared by several end systems or signal sources. For example, referring to FIG. 3, a DBC 20-3 is shown connected to a broadband ATM switch 12-3 forming part of the network 10, the traffic of three sources 14C being handled using an output buffer 28. The number of sources which can be handled by the DBC 20-3 is determined by the link rate L (i.e. there must be not so many sources that it is always the link rate L which is the limiting factor determining the available rate.) The aggregate cell rate of the ABR traffic from the sources 14C must not exceed L. This implies that if the traffic from each source is bursty, there may be times when the output buffer 28 is congested. This can be avoided by supplementing the sustained cell rate (CR) feedback to the end systems 14C with generic flow control (GFC) signals which operate to stop all transmissions from each source immediately.

Figure 3:
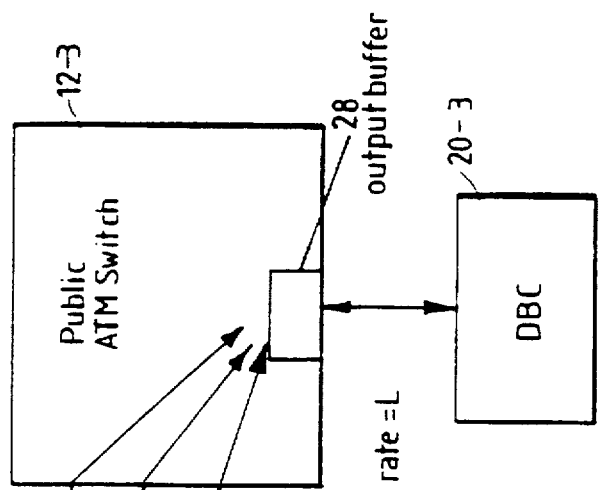
FIG. 3 is a diagram of part of a broadband switching network showing how a single bandwidth controller can be shared by several end systems.

Whenever the dynamic bandwidth controller (DBC) is incorporated in the arrangements of FIGS. 1, 2, or 3, its main functions are as follows.

Firstly, it provides buffering of incoming data cells, the degree of buffering at any given time being determined according to the transmission containing the cells, the transmission being identified by the VPI and VCI information referred to above. The DBC further controls or "shapes" the traffic fed to the network 10 so as to be equal to the current CR applicable to that particular transmission, the CR depending on the allocated bandwidth.

The allocated bandwidth, and hence the CR, for any given transmission is determined by the CAC 18 (see FIG. 1) on the basis of determining the route to be followed by the transmission and assigning a fair share of the available capacity on the route based upon the known number of active transmissions.

When a transmission begins it is detected in the DBC, which immediately transmits a low default CR to the relevant end system 14 (see FIG. 1). This ensures that a newly active transmitting source does not cause overload in the network 10 before the CAC 18 has been able to allocate bandwidth and derive an CR for that transmission. The traffic associated with that transmission leaving the DBC 20 is shaped to correspond to the default CR. This is part of a second main function of the DBC, i.e. to send a feedback signal to the end system for the purpose of controlling its transmitted cell rate. Indeed, each time the CAC 18 derives a new CR for a transmission, a CR advice signal is fed back to the end system.

The pre-transmission buffering by the DBC is used to allow a cooperating end system sufficient time to adjust its output to the latest CR feedback advice. This implies that whilst the most recent CR is immediately used in the DBC to shape output traffic from the DBC, there is sufficient buffering in the DBC to allow excess cells to enter for a period at least equal to the round trip delay between the DBC and the end system. If cells continue to arrive from the end system 14 at a rate greater than the advised feedback CR (for instance, because the CR was lost en route, or because of a faulty end system) the excess cells will be dropped in the DBC by overflow of the buffer.

In the preferred DBC, it is also possible to include fault tolerance by making use of a buffer threshold. When the stored cells relating to a given transmission reach the threshold, retransmission of the CR advice feedback to the end system is triggered. This feature is useful also as a mechanism for policing end systems to prevent inefficient use of bandwidth, whether due to a faulty terminal or due to deliberate non-compliance with contracted transmission rules. In this way, interference with the quality of service provided for other, compliant end systems is prevented. In effect, the DBC defines the ABR traffic contract with the network 10.

The modules of the DBC 20 will now be described in more detail with reference to FIG. 4.

Figure 4:
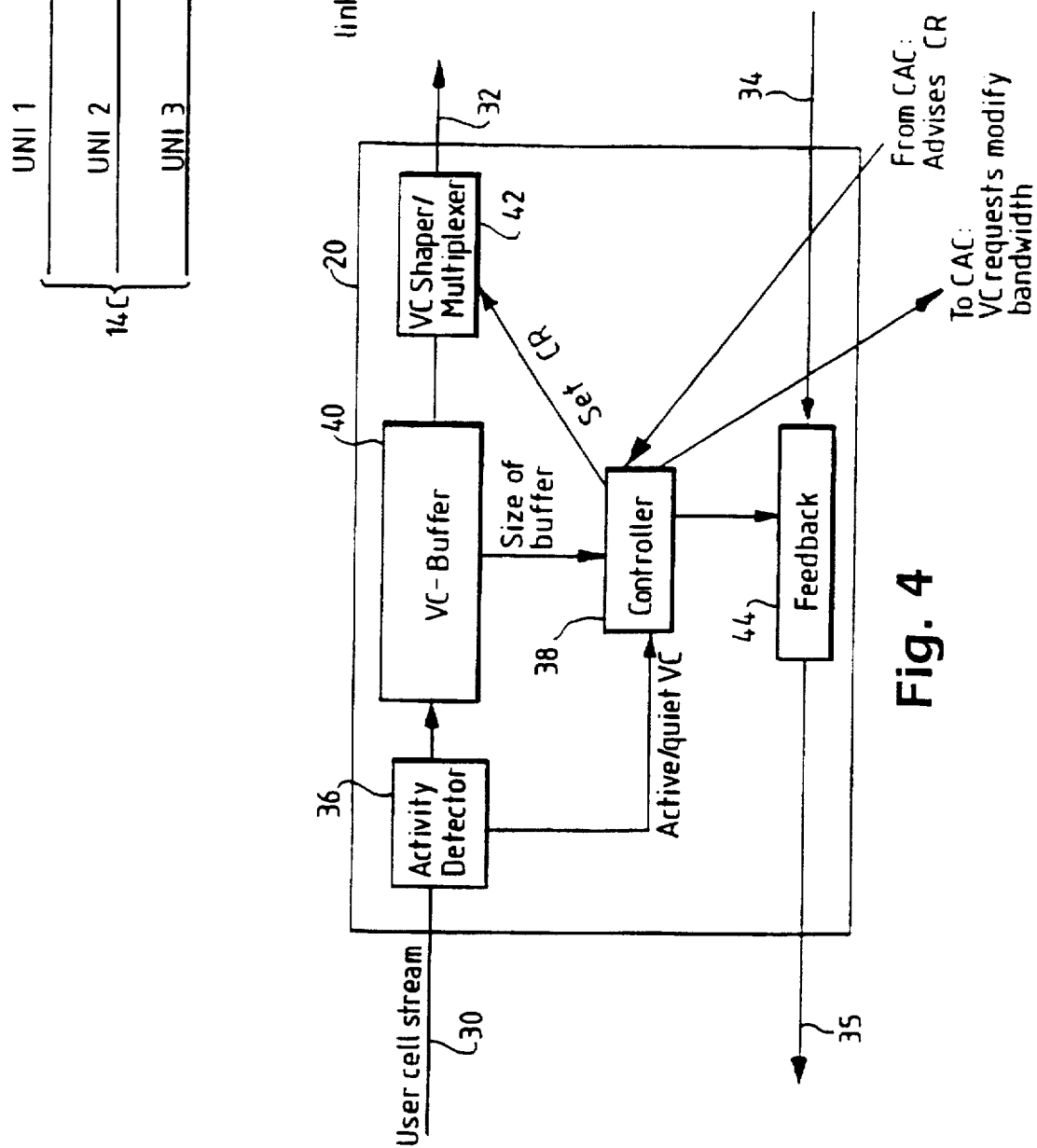
FIG. 4 is a block diagram of a bandwidth controller for use in the networks of FIGS. 1 and 2.
Figure 5:
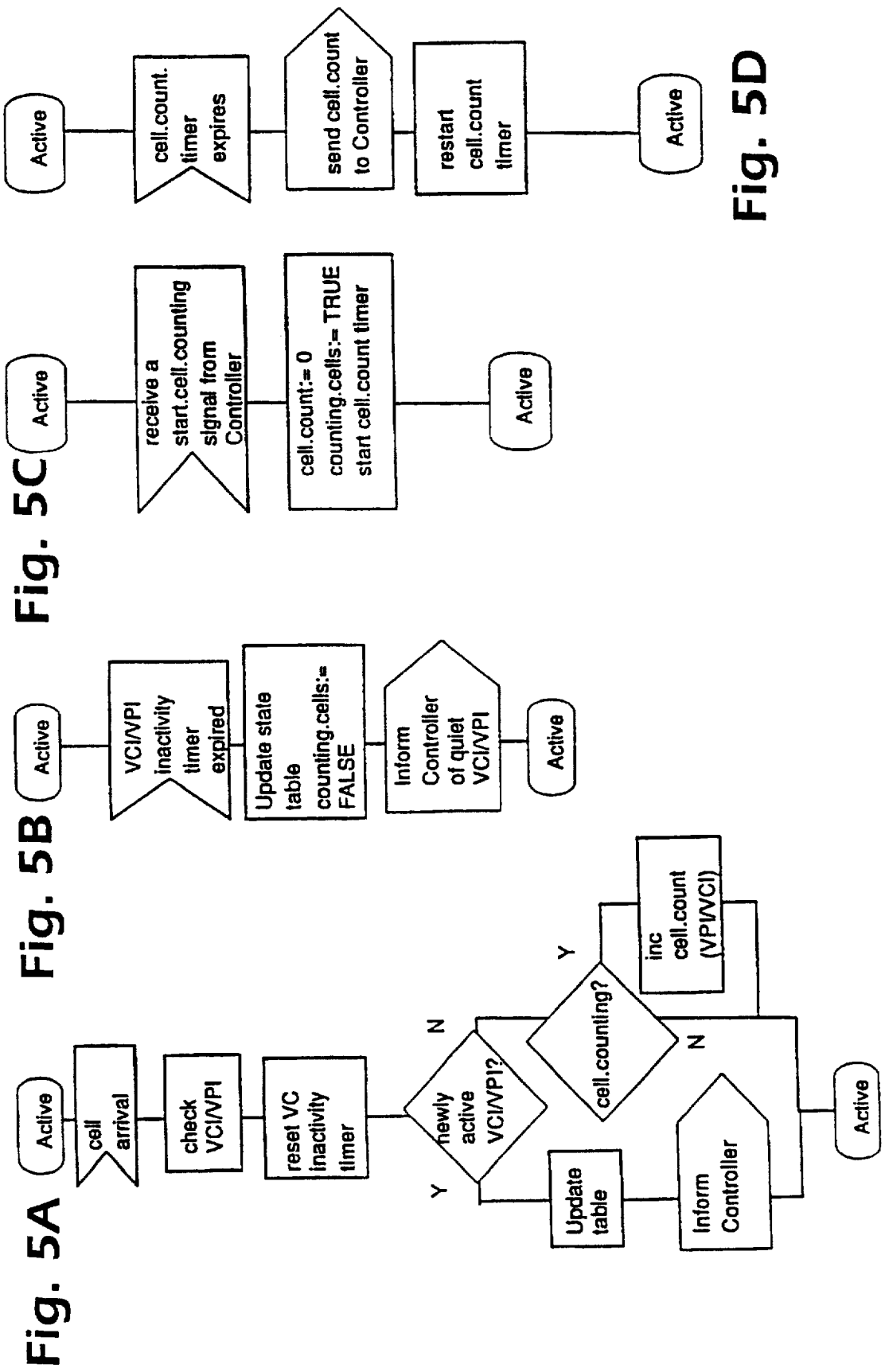
FIGS. 5A-5D are a specification description language diagram (SDL) for the activity detector module shown in FIG. 4.

The DBC 20 is shown in FIG. 4 is a discrete unit having an input port 30 for receiving asynchronously transmitted data cells, an output for feeding data cells onto a switch 12 or 16 (see FIGS. 1 and 2) forming part of the switching network 10. The unit also has another input 34 for receiving messages back from the switch 12 or 16 and a feedback output 35 for transmitting feedback messages to the end system 14 (shown in FIG. 1). Although the DBC 20 is shown as a discrete unit, it will be appreciated that FIG. 4 can be regarded as a functional diagram representing a subset system of a larger data processing unit, much of which may be embodied as software functions.

Incoming cells on input 30 arrive as a user cell stream which is fed firstly to an activity detector 36. The purpose of the activity detector is to provide state information to a controller module 38 about each received transmission, each transmission being identified by its VPI and VCI contained in the cell headers. A transmission is labelled active by the activity detector 36 if it was previously quiet and a cell having the appropriate VPI and VCI values is observed to be transmitted from an end system to input 30. Synchronisation of the activity detector 36 with the start of a cell header may be carried out using an error check field contained in the cell header. A transmission is considered to be in an inactive state if it was previously active and no cell having the appropriate VPI and VCI values has been detected for a period of time t. Activity detector 36 maintains a timer and state table for each VPI/VCI value pair, ready for an interrogation by the controller 38. Preferably, t is set to be several seconds so that active-inactive-active transitions relating to any given VPI/VCI value pair which are of the order of several milliseconds remain undetected so that the transmission is indicated as remaining in the active state under these conditions. This has the effect of reducing the frequency of messages sent by the DBC 20 to the connection admission control CAC 18 at some expense to lowering utilisation of the network.

Another function of the activity detector 36 is that of counting the cells for a transmission during an interval between a "get cell count" and a "stop cell count" request from the controller 38. This information can be used, for example, for charging purposes and also by the controller 38 for assessing the actual cell rate of received transmissions.

Pseudocode for the activity detector is listed below and the corresponding SDL appears in FIG. 5A–5D.

```
BEGIN {cell arrival}
    cell arrival from end system
    read VC
    reset VC inactivity timer
    IF VC is newly active THEN
        update state table
        advise CONTROLLER of newly active VC
    ELSE IF counting.cells(VPI/VCI) THEN
        increment cell.count(VPI/VCI)
    ELSE
        do nothing
END
BEGIN {VC timer expires}
    VC inactivity timer expires indicating quiet VC
    update state table
    advise CONTROLLER of quiet VC
    counting.cells :=FALSE
END
BEGIN {receive a start.cell.count signal }
    receive a start.cell.count(VPI/VCI) signal from CONTROLLER
    cell.count(VPI/VCI) :=0
    counting.cells :=TRUE
END
BEGIN {cell.count timer expires}
    cell.count timer expires
    send cell.count(VPI/VCI) to CONTROLLER
    restart cell.count timer
END
```

It will be seen that, as far as the incoming user cell stream is concerned, the activity detector 36 reads the VPI/VCI values in each cell header of the arriving cell stream, and this information is used to update the state table which it maintains for each VPI/VCI value pair. As far as communication with the controller 38 is concerned, the detector 36 informs the controller of a change of state of any VPI/VCI value pair. The controller can inform the activity detector of the timer value t to be used. Preferably, the same value of t is used for all VPI/VCI value pairs. Cell count information may be obtained from the activity detector 36 by the controller 38, through a "start.cell.count" message. When the activity detector receives this message, it initialises a timer, and counts each cell arrival. At the expiry of each cycle t, the activity detector sends the cells count to the controller.

The cells of the user cell stream arriving on input 30 are transmitted without delay to a buffer module 40 where they are stored in first-in, first-out (FIFO) buffer queues, each queue comprising cells having a given VPI/VCI value pair. The detector 36 is non-specific to cell type. Thus, the arrival of any data cells will be detected and can potentially affect the activity state associated with a VPI/VCI value pair, independently of the existence or absence of control or management cells. Buffered cells are fed from the buffer 40 to a shaper multiplexer module 42 prior to being fed to an ATM switch via output 32. Operation of the buffer and shaper/multiplexer modules 40, 42 will be described in more detail below. For the time being, it is sufficient simply to say that the buffer module is capable of signalling to the controller 38 when any buffer queue has reached a predetermined buffer fill threshold. The shaper multiplexer module 42 is responsible for removing cells from the buffer module 40 and transmitting them onwards towards their destination.

It includes a multiplexer function and the shaper stores an CR value for each VPI/VCI value pair so that the cell stream fed from the output is shaped to ensure that the capacity of the respective path through the network for each transmission, as determined by the allocated bandwidth, is not exceeded. The controller 38 also controls a feedback module 44 for receiving feedback messages from the network on input 34 and from the controller 38 itself, for onward transmission to the end system 14 via output 35. The functions of the buffer, shaper/multiplexer, and feedback modules 40, 42 and 44 will be described in more detail below. The controller 38 will be considered first.

The purpose of the controller 38 is to signal to the connection admission control (CAC) 18 that an ABR type transmission identified by any given VPI/VCI value pair should have bandwidth in the network allocated or re-negotiated. In this embodiment of the invention, a bandwidth re-negotiation signal is transmitted by the controller to the CAC 18 such that when the activity detector 36 indicates that a transmission having a particular VPI/VCI value pair is quiet, the bandwidth parameter for that transmission should be set to zero. For a newly active transmission, the bandwidth parameter should be set according to the traffic in the network. This re-negotiation signal is interpreted by the CAC 18 (FIG. 1) as a request for available bandwidth, in which case the CAC releases bandwidth to the transmission according to its own control parameters.

The controller 38 signals re-negotiation whenever the activity detector 36 indicates a state change for the transmission in question. The CAC 18 responds by feeding a new CR advice value to the controller 38 which, in turn, updates the shaper/multiplexer module 42 and signals the new CR value to the end system 14 (FIG. 1) via output 35. During the period when the CAC is processing a bandwidth re-negotiation or allocation request, the controller 38 sets a default CR in the shaper/multiplexer and feedback modules 42 and 44.

The controller 38 is also responsible for monitoring the actual sending rate of users in cases of transmissions having seized a large effective capacity. This is done by initializing a timer in the activity detector 36 which may have a time-out period of a few seconds, and at the end of this period the activity detector 36 delivers a cell count to the controller 38. Cell counting continues for as long as the signal for the relevant VPI/VCI value pair has a large share of bandwidth in order that the bandwidth is not seized by the signal source, which then transmits at full capacity at first, and subsequently reduces its output to a trickle. The cell count information is processed together with the last CR value advised by the CAC to estimate the network capacity equivalent to the actual sending rate of the user. If this capacity is substantially less than the currently allocated capacity, it may imply that the user is attempting to keep a large capacity simply by sending a relatively slow trickle of cells to input 30 to keep the activity detector status for the relevant transmission in the active state. Clearly this situation results in inefficient use of the network, and the following steps are performed by the controller 38 when there is a substantial mismatch in the capacity assigned and currently used. Firstly, the shaper 42 is immediately re-set to drop to the actual CR for the relevant VPI/VCI value pair. Next, the feedback module 44 is commanded to issue the actual CR to the user via output 35. Finally, the controller 38 sends a bandwidth re-negotiation signal to the CAC, the signal including a bandwidth value which is set equal to the current equivalent capacity being used by the user. This signal is then interpreted by the CAC as an option to free capacity for other customers. As an alternative, the mismatch may be dealt with by assigning to the shaper and the feedback modules 42, 44 a default CR rather than the actual CR.

As mentioned above, the controller 38 is also arranged to receive a signal from the buffer module 40 when the buffer fill for a given VPI/VCI value pair has reached a given threshold. This signal causes the controller 38 to command the feedback module 44 to issue a so-called resource management (RM) cell, which will be described in more detail hereinafter. The controller 38 may also receive a DBC identity value for each new transmission (identified by a new VPI/VCI value pair) which is established, this DBC identity value being received from the CAC. Alternatively, the DBC may use a default identity if none is supplied.

Pseudocode for the controller appears below:

```
BEGIN
    receive a CR from CAC
    derive minimum.cell.count value
    IF minimum.cell.count value C>M{WHERE M INDICATES
        A LARGE SHARE OF BANDWIDTH}
    THEN
        send signal to ACTIVITY DETECTOR to start
        cell.count (VPI/VCI)
    ELSE
        do nothing
END
BEGIN
    receive cell.count(VPI(VCI) from ACTIVITY DETECTOR
    IF cell.count(VPI/VCI)<minimum.cell.count THEN
        send actual CR to Shaper
        send actual CR to Feedback
        advise CAC of actual rate
    ELSE
        do nothing
END
BEGIN {Receive a VPI/VCI buffer threshold signal}
    receive a VPI/VCI buffer-threshold signal from VPI/VCI-buffer
    advise FEEDBACK to retransmit CR to end system
END {Receive a VPI/VCI buffer threshold signal}
BEGIN {Receive a VPI/VCI active signal}
    receive a VPI/VCI active signal from ACTIVITY DETECTOR
    advise CAC of newly active VPI/VCI
    advise SHAPER of newly active VPI/VCI and default CR
    advise FEEDBACK to transmit default CR in RM cell
    to end system
END {Receive a VPI/VCI active signal}
BEGIN {Receive a VPI/VCI inactive signal}
    receive a VPI/VCI inactive signal from ACTIVITY DETECTOR
    advise CAC of inactive VPI/VCI
END {Receive a VPI/VCI inactive signal}
```

Figures 1B, 1C, 6:
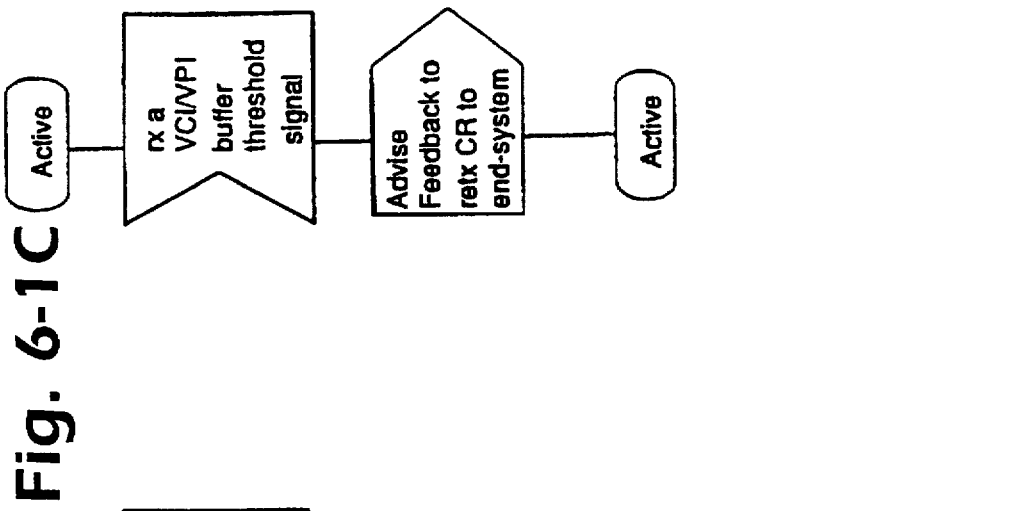
FIGS. 6-1A through 6-1C and 6-2D through 6-2E are SDLs for the controller module of FIG. 4.
Figures 1A, 6:
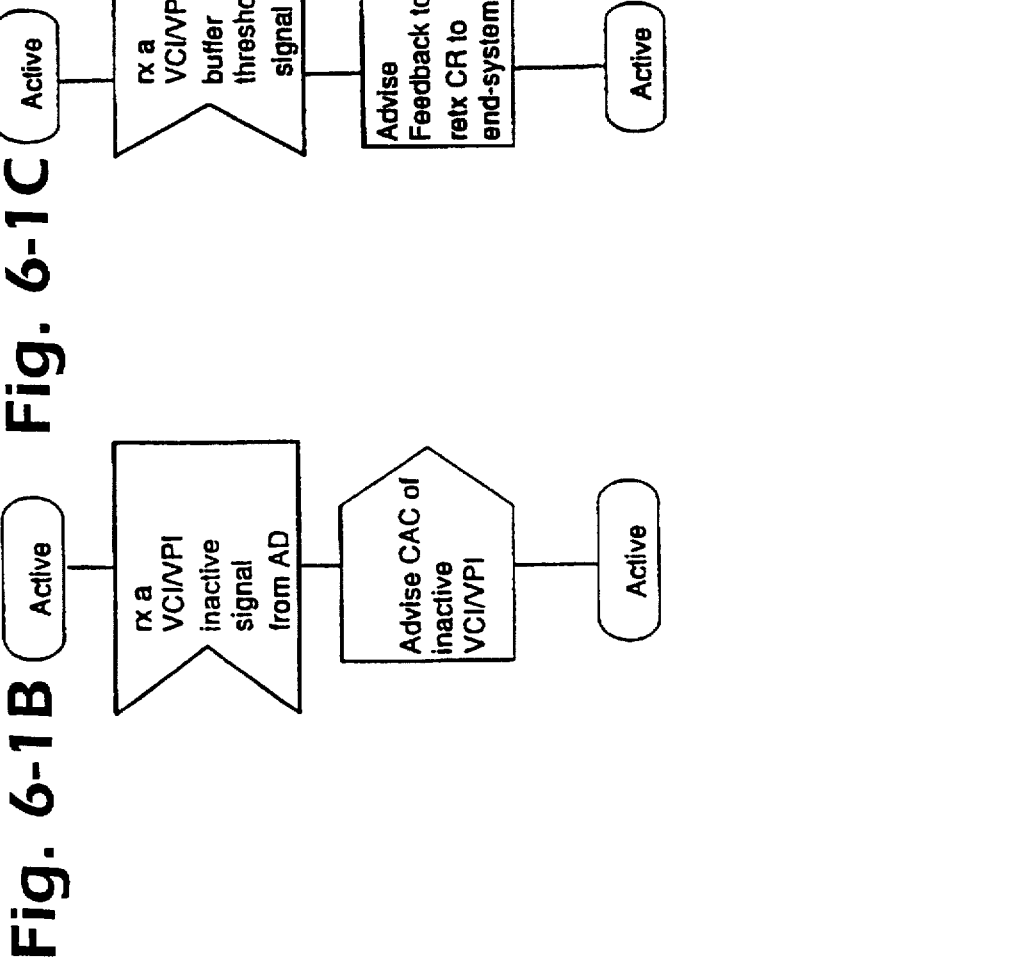
Figures 2E, 6:
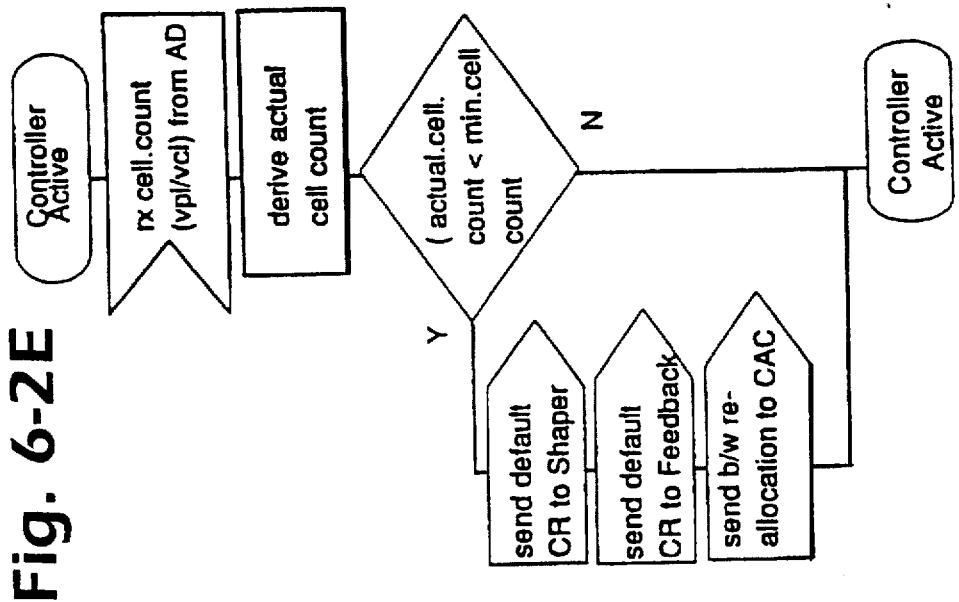
Figures 2D, 6:
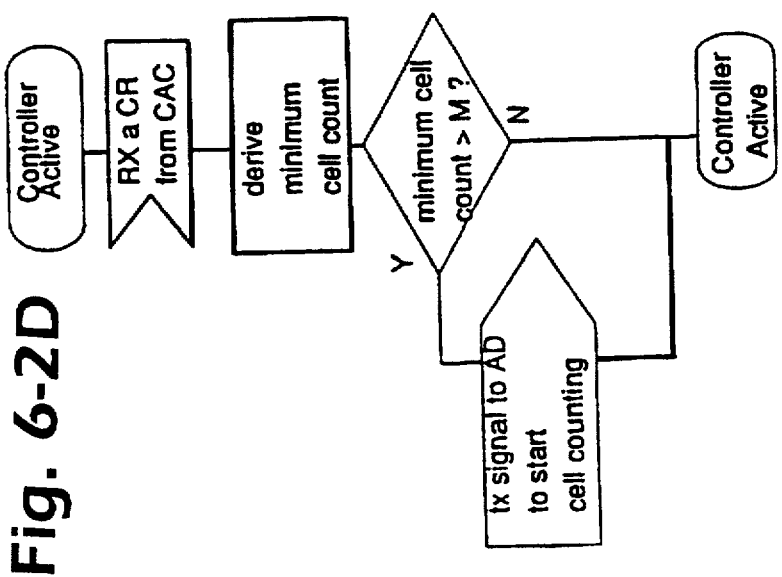

Corresponding SDLs for the controller are shown in FIGS. 6-1A through 6-1C and 6-2D through 6-2E. In FIGS. 6-2D and 6-2E, L is typically 1 Mbit/s.

As will be seen from the above pseudocode, the DBC 20 issues a bandwidth re-negotiation request to the CAC for a given transmission (having a given VPI/VCI value pair) when its activity state as indicated by activity detector 36 has changed. This state may be deliberately changing only slowly if the activity detector 36 is set not to notice periods of quiet behaviour which are less than several seconds in length. In response, the DBC 20 receives a signal from the CAC advising the new CR value. The DBC may also be advised of the correct DBC identity for each transmission.

The controller 38 may be arranged to write a DBC, VPI/VCI identity value pair into the feedback module 44. It is also arranged to instruct the feedback module 44 to issue a resource management command for a specific VPI/VCI value pair. This instruction may also contain an appropriate CR pair T, τ, (T is an average cell inter-arrival time and τ is a burst tolerance). It should be noted that only one change in the values specified in an RM cell is sent for each new VPI/VCI value pair whenever the CAC updates the CR value. Typically, this may be once every 30 seconds or more in a public network, and depends upon the sensitivity setting of the activity detector in the DBC 20. It follows that the required feedback control bandwidth can be relatively small.

As will be seen from the pseudocode, the controller 38 receives signals from the buffer module 40 whenever a buffer fill threshold is reached by cells having a specific VPI/VCI value pair.

The interface with the activity detector 36 has already been described.

With regard to the controller pseudocode for the interface with the shaper/multiplexer module 42, the controller 38 is seen to update the shaper with the current CR value to be applied to a given transmission whenever it receives CR advice from the CAC or (using the default CR) whenever it receives advice of a newly active transmission from the activity detector 36.

The purpose of the feedback module 44 will now be described briefly.

As mentioned above, the feedback module 44 transmits current CR values (as signalled by the controller 38) to the end system via output 35. The CR is transmitted using a resource management cell as shown in FIG. 7. Optionally, one field of this cell is the DBC identity value which is used to enable an end system 14 (see FIG. 1) to distinguish between CR advices from different DBCs (e.g. DBCs 20-1 and 20-2 as shown in FIG. 2) in the end system to end system path. This DBC identity field is indicated as field 50 in FIG. 7. The CR is placed in field 52. This RM cell, like other cells, has a five octet header which contains a PT field 54 indicating that the cell is a resource management (RM) cell.

It is proposed that, if used, DBC identity values are not fixed but are chosen at the time of setting up the transmission path through the network for a given a VPI/VCI value pair. This implies that the CAC 18 assigns a value for the DBC identity for each VPI/VCI value pair, and the feedback module 44 maintains a table of (DBC, VPI/VCI) identity pairs. For example, in FIG. 2, public network 10-1 is arranged to choose a DBC identity for a given VPI/VCI pair and signals this information forwards so that public network 10-2 does not chose the same value (e.g. public network 10-1 assigns identity 1, public network 10-2 assigns identity 2, etc). The DBC identity value is stored in a table maintained by the feedback module 44.

The CR field 52 in the RM cell (see FIG. 7) contains the CR advice from the CAC which is provided as the average cell inter-arrival time T, plus a burst tolerance T.

Operation of the feedback module 44 is triggered by the controller 38 (a) when a new CR is advised by the CAC 18, and (b) when the buffer fill level in buffer module 40 corresponding to any VPI/VCI value pair rises above the buffer fill threshold. A RM cell is then sent to the end system.

Figure 8A:
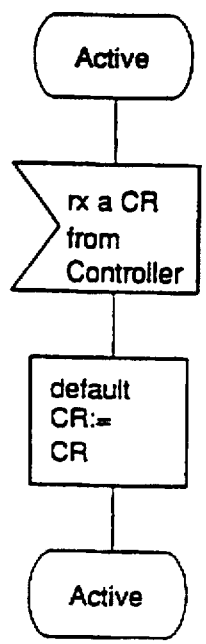
FIGS. 8A-8B are is an SDL for the feedback module of FIG. 4.
Figure 8B:
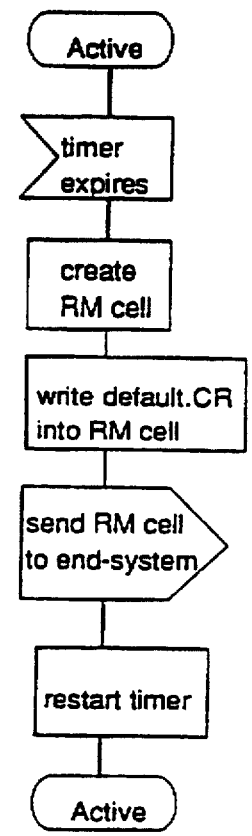

The pseudocode for the feedback module 44 is as follows and the corresponding SDL is shown in FIGS. 8A and 8B.

```
BEGIN {Receive a CR}
    receive a CR for a VPI/VCI from Controller
    default_CR:=CR
END {Receive an CR}
BEGIN {RM.cell timer expires}
    RM.cell timer expires
    create RM.cell
    write default.CR into RM.cell
```

```
    send RM.cell to end-system
    restart RM.cell timer
END {cell arrival from network}
```

Next the buffer module 40 will be considered.

The buffer module is shown in more detail in FIG. 9. Its purpose is to store incoming data cells on the basis of the VPI/VCI value pairs contained in the cells. Buffering the cells allows an end system 14 (FIG. 1) time to respond to a feedback signal from module 44. Another function of the buffer module 40 is to send a signal to the controller 38 when the buffer fill threshold is reached, indicating that an end system is not responding to a feedback signal (this in turn causes the controller 38 to re-send a sustained cell rate signal (CR) to the end system, as mentioned above). The buffer module 40 also drops received cells when the maximum buffer allocation for a given VPI/VCI value pair is exceeded. This is done by buffer overflow.

The size of buffer required for a DBC 20 controlling access to the switching network 10 could be relatively small. For example, if the DBC 20 has a combined input rate from all sources of 150 Mbit/s, then, if the round trip delay to the end system is 100 μs, there will be less than 35 cells in flight whenever the CR values are changed. The size of the shared memory area 56 is mainly to cater for changes in the burst tolerance, because a change in this rate leads to only a small number of excess cell arrivals (e.g. around 35 cells). The fixed cell positions assigned to respective VPI/VCI value pairs are designated by the reference numeral 58 in FIG. 9. The cells in these positions represent the front cells of a plurality of queues, each queue having its own VPI/VCI value pair. In other words, the queues can be visualised as running horizontally in FIG. 9 with the front cells at the right hand side. Cells arriving in the buffer module 40 are placed in the queues in a first-in, first-out (FIFO) order.

Cells are removed from the buffer module 40 when an appropriate signal is received from the shaper section of the shaper/multiplexer module 42, as defined by the buffer module pseudocode which follows:

```
BEGIN {Receive a cell}
    receive a cell
    IF there is room in the buffer THEN
        put cell in buffer
        increment buffer-fill level
    IF buffer-fill level =Threshold THEN
        transmit buffer-full signal to CONTROLLER
    ELSE
        do nothing
END {Receive a cell}
BEGIN {Receive a fetch}
    receive a VPI/VCI fetch signal from the SHAPER/MUX
    pass cell from buffer to the SHAPER/MUX
    decrement buffer-fill level
END {Receive a fetch}
```

Figures 10A, 10B:
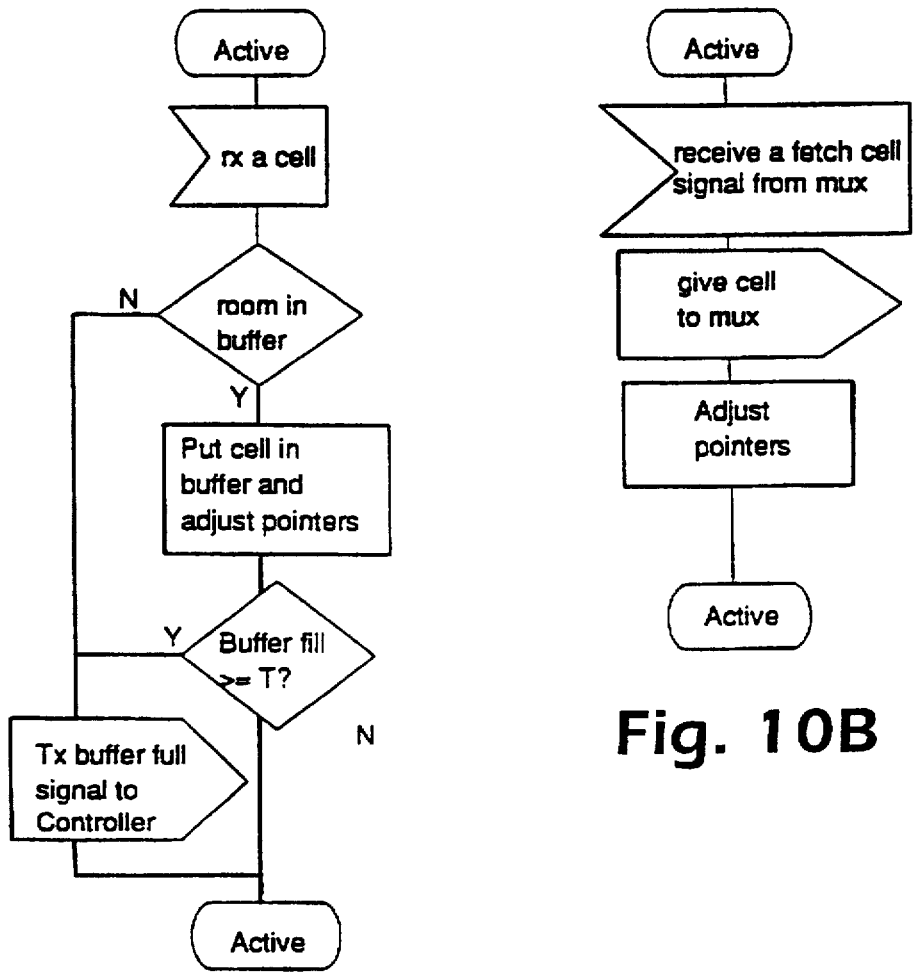
FIGS. 10A-10B are is an SDL for the buffer.
Figures 1C, 12:
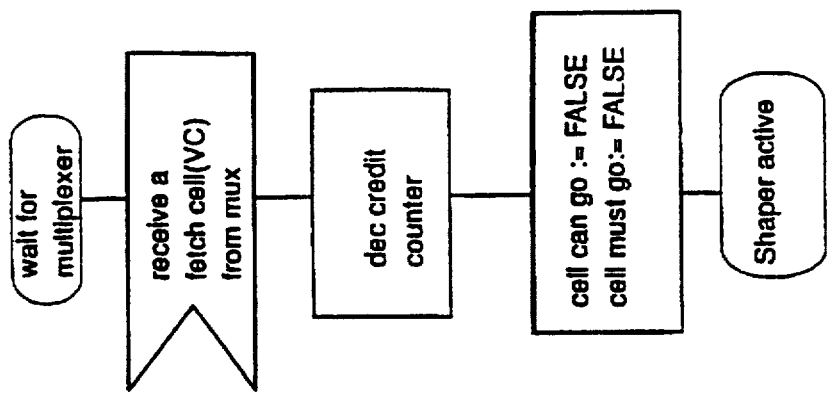
Figures 1B, 12:
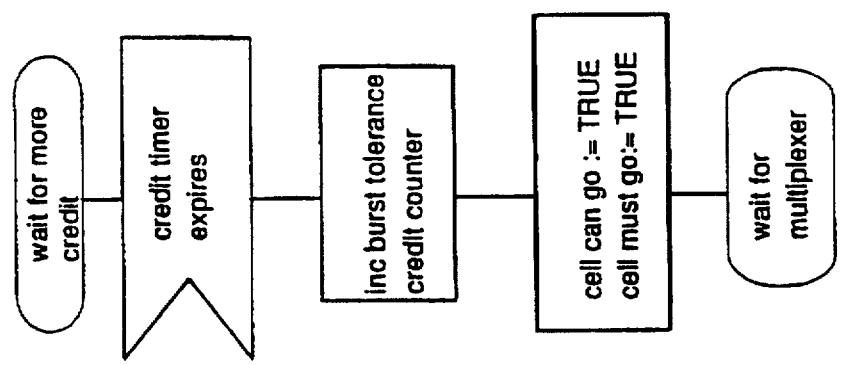
Figures 1A, 12:
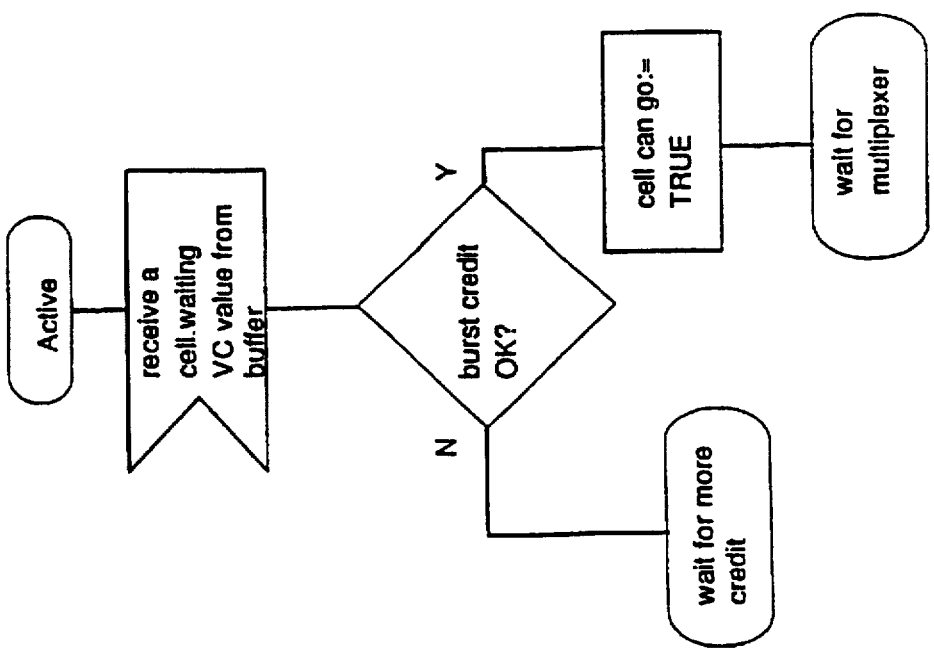
Figures 3H, 12:
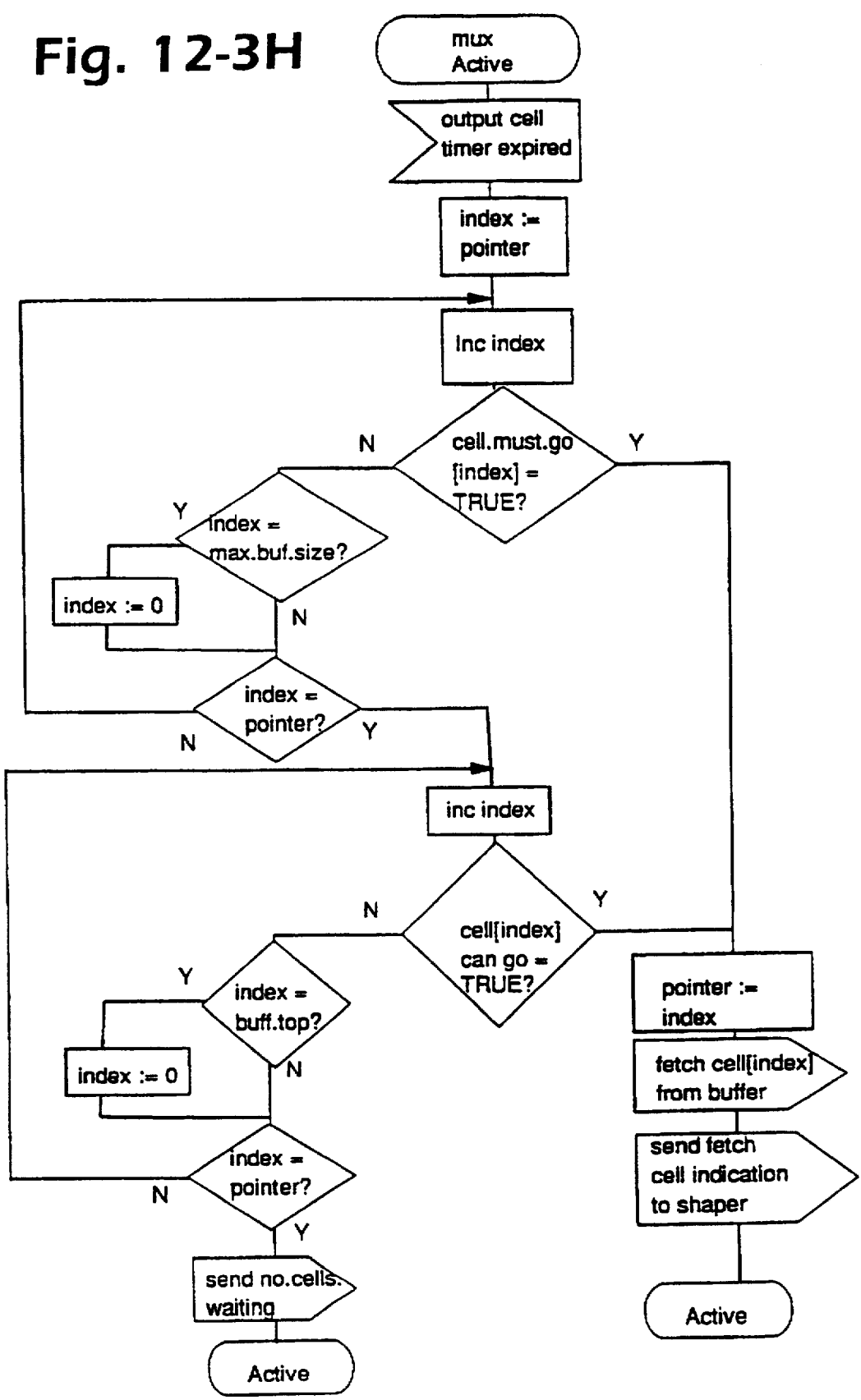

The corresponding SDL appears in FIG. 10A–10B.

Referring now to FIG. 4 in combination with FIG. 11, the shaper/multiplexer module 42 operates to remove cells from the buffer module 40 and to transmit them onwards towards their destination via the network switches. Module 42 has two parts which are a multiplexer 60 and a shaper 62. For each VPI/VCI value pair, the shaper 62 maintains a sustained cell rate (CR) value and a timer.

The cell stream fed to output 32 is shaped by the shaper 62 so that bursts which are not greater than the burst tolerance τ pass without being delayed by the shaper 62. However, the multiplex function may delay a cell if several transmissions represented by different VPI/VCI value pairs are bursting simultaneously. In this case, the multiplexer 60 assigns each active VPI/VCI value pair a fair share of the DBC output bandwidth. It does this by polling active VPI/VCI value pairs in a round-robin fashion. Cells which are waiting for a period equal to or greater than the rate interval T are flagged with a higher priority "cell must go" value. The multiplexer picks up these cells first (see FIG. 11). Cells will be forced to wait by the shaper function if bursts arrive which are longer than the burst tolerance credit value. The detailed operation of the shaper/multiplexer module 42 will become apparent from the following pseudocode (see FIGS. 12-1A through 12-1C, 12-2D through 12-2G and 12-3H for the corresponding SDLS):

```
1.  BEGIN {STATE =ACTIVE}
        receive a cell.waiting[VPI/VCI] signal from buffer
        IF burst credit ok THEN
            cell.can.go:= TRUE
            STATE:= WAIT for multiplexer
        ELSE {burst credit not ok}
            STATE :=WAIT for credit timer to expire
    END
2.  BEGIN {STATE =WAIT for credit timer to expire}
        credit timer expires
        increment burst tolerance credit counter
        cell.can.go :=TRUE
        cell.must.go :=TRUE
        STATE :=WAIT for multiplexer
    END
3.  BEGIN {STATE =WAIT for multiplexer}
        receive a fetch.cell[VPI/VCI] from multiplexer
        decrement credit counter
        cell.can.go :=FALSE
        cell.must.go :=FALSE
        STATE:= ACTIVE
    END
4.  BEGIN {STATE =WAIT for multiplexer}
        credit timer expires
        IF credit counter <τ THEN
            increment credit counter
        ELSE
            do nothing
            cell.must.go :=TRUE
    END
5.  BEGIN {STATE =SHAPER ACTIVE}
        credit timer expires
        IF credit counter <τ THEN
            increment credit counter
        ELSE
            do nothing
            cell.must.go :=TRUE
    END
6.  BEGIN {STATE =SHAPER.CR ACTIVE}
        new CR advised (T,τ)
        nextT:= T
        nextcredit:= τ
    END
7.  BEGIN {STATE =SHAPER TIMER ACTIVE}
        timer expires
        reset timer (nexT)
    END
8.  BEGIN {STATE =MULTIPLEXER ACTIVE}
        output cell timer expires
        index :=pointer
        REPEAT {1st loop of searching for cell.must.go}
            increment index
            IF cell.must.go[index] THEN
                pointer:= index
                fetch cell[index] from buffer
                send fetch cell signal to SHAPER
                STATE :=MUX.ACTIVE
            ELSE
                IF index =max.buffer.size THEN
                    index :=0
        UNTIL index =pointer
```

-continued

```
REPEAT {2nd loop of searching for cell.can.go}
    increment index
    IF cell.can.go[index] THEN
        pointer:= index
        fetch cell[index] from buffer
        send fetch cell signal to SHAPER
        STATE :=MUX.ACTIVE
    ELSE
        IF index =max buffer.size THEN
            index :=0
    UNTIL index =pointer
    send no.cell.waiting.signal
END
```

It will be understood that when the DBC 20 requests a change in the bandwidth allocated to a particular transmission, the CAC must control other traffic in the network so that the network capacity is used most effectively. The description which follows deals with connection admission control methods for overcoming the problem of traffic rebalancing.

Two connection admission control strategies will now be described. Both tackle the problem of rebalancing traffic. In other words, when a transmission becomes quiet or newly active, it is necessary to determine how many other control messages need to be generated for other transmissions. The object is to make this number of control messages as small as possible.

The first strategy involves a relatively simple connection admission control method which involves no actual rebalancing. In this method, a newly active transmission (VPI/VCI value pair) is given a single sustained cell rate (CR) which is retained until the transmission goes quiet again. Only when it is subsequently reactivated will the transmission get a different CR. This means that a quiet signal relating to one VPI/VCI value pair will cause no control signals to be generated for other VPI/VCI value pairs which were sharing capacity with it.

This is combined with a filling method which involves (i) giving a first newly active connection an effective capacity which is half of the total available capacity; (ii) giving the next newly active connection an effective capacity which is half of the remaining capacity; (iii) giving the next newly active connection an effective capacity which is half of the still remaining capacity; and so on. This method is applied link-by-link over the entire route identified by the VPI/VCI value pair, and whichever yields the lowest effective capacity is the determinant of the CR fed back to the DBC 20.

It follows that a newly active signal having one VPI/VCI value pair generates no control signals for the other VPI/VCI value pairs which are sharing the capacity.

Since the DBC 20 is designed such that a user can only maintain a large effective capacity on the network so long as the VPI/VCI value pair remains in the active state in the activity detector 36 (FIG. 4), and the cell rate generated by the customer is close to the effective bandwidth value (refer to the cell-counting function of the activity detector described above), it follows that users can only hold onto large effective bandwidths for as long as they are prepared to be charged for the proportionally larger loads which they are submitting.

This method is fair to users in the sense that, over a sufficiently long period, no user is systematically given a poorer capacity.

However, it is desirable in some circumstances to increase the number of users who are able to secure relatively large bandwidth allocations and this can be catered for by a second, modified method as follows.

In this case the underlying principle is that, if an active signal causes control signals for other VPI/VCI value pairs, let the signal be limited to only one per link, namely the richest (largest capacity) VPI/VCI value pair. This can be described as a limited rebalancing method or a "take-only-from-the-richest" (Robin Hood) method.

This can best be illustrated with an example filling method:

(i) the first newly active VPI/VCI value pair is assigned an effective capacity equal to half of the total available capacity;

(ii) the next newly active connection is assigned half of the remaining capacity plus a fifth of the effective capacity of the first VPI/VCI value pair (i.e. the current richest);

(iii) the next newly active connection is assigned half of the remaining capacity plus one fifth from the current richest; and so on.

To illustrate this process, it may be imagined that there is a single link with a capacity of 100 Mbit/s. The above steps then result in the following exemplary steps:

(i) the first newly active VPI/VCI value pair gets 50 Mbit/s and there is 50 Mbit/s remaining;

(ii) the next VPI/VCI value pair gets half of the remainder (which yields 25 Mbit/s) plus a fifth from the first, which means that the first now has 40 Mbit/s, and the second has 35 Mbit/s;

(iii) the next VPI/VCI value pair gets half of the remainder, which yields 12.5 Mbit/s plus a fifth from the first, so that the first now has 32 Mbit/s, the second still has 35 Mbit/s, the third has 20.5 Mbit/s, and so on.

Note that more of the users are now getting large capacities, but there is only one extra control message to send on the link. There is thus a limited rebalancing or "Robin Hood" strategy.

To extend the method to a route with many links, the above process is repeated link-by-link. Whichever link yields the lowest effective capacity is the determinant of the CR value sent back to the dynamic bandwidth controller (DBC). Now, using this value of effective capacity, the CAC assigns it link-by-link by taking half of the remaining capacity on that link, and any extra which is needed is taken from the richest VPI/VCI value pair on that link. Consequently, this generates at most one additional CR control message per link for each VPI/VCI active signal sent to the network. A quiet signal still generates no additional control messages.

This strategy also makes it impossible for a user to hold onto a very large capacity when others become active. In addition, as many users as possible are given a reasonably large capacity while keeping the complexity of traffic rebalancing to a minimum.

A second embodiment of the invention will now be described with reference to FIGS. 13 to 15. In this case, operation of a dynamic bandwidth controller (DBC) in combination with a usage parameter controller (UPC) 22 is described, using a modified DBC configuration.

It will be recalled that each ATM cell has an information field of 48 octets and a header of 5 octets.

The cell header may include a cell loss priority bit, allowing each cell to be identified as having high priority or low priority. When congestion occurs, that is to say when elements within the overall switching network reach capacity, the network is arranged such that low priority cells are discarded in preference to high priority cells. Furthermore, in any operational network, the network itself would be designed such that, under normal operating circumstances, high priority cells would always be allowed through the network, so that congestion, resulting in the loss of low priority cells, would only occur during periods of peak demand. For some forms of data transmission, such as 64 kbit/s voice, cell loss may be acceptable. However, in other circumstances, it may be highly undesirable for cells to be lost, particularly when non-redundant data is being transmitted, under which circumstances a user would expect traffic controls to ensure that all data cells were transmitted through the network with very low losses.

Figure 13:
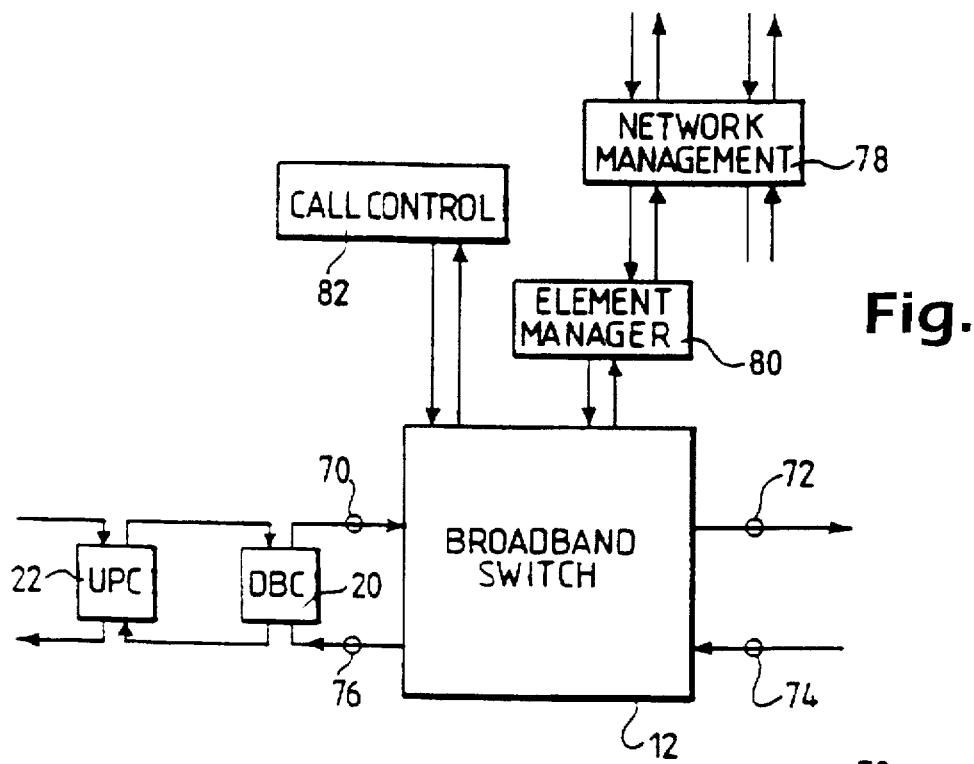
FIG. 13 is a block diagram of a sub-switching network of an alternative broadband switching network in accordance with the invention, including a broadband asynchronous switch, a usage parameter control device and a dynamic bandwidth controller.

The arrangement of FIG. 13 forms part of a network which may operate in several ways, although two preferred modes of operation will be identified. One mode is to provide permanent connections between users, of the leased-line type. In this mode of operation, a communications channel between a first user and a second user is established, and thereafter this channel remains permanently connected. In a second mode of operation, the network operates in a switched-like way, in that signalling commands are issued by a user. These signalling commands, are in turn, interpreted by the switch 12, resulting in the connection being established. However, in some data networking applications, it is envisaged that, once the connection has been established, it would remain in place for a significant period, possibly days. Therefore, such a link differs significantly from connections made via the public switch telephone network (PSTN), for example, where connection time is usually measured in minutes. In this second mode, then, the network provides a service similar to that provided by leased lines. In its first mode of operation, which provides the basis for the embodiment now to be described the end system behaves as if leased line were provided between communicating sites. Under this preferred mode of operation, it is unnecessary for the end system to include any mechanisms for generating signalling, allowing the first user immediately to initiate communication with the second user.

Thus, signals generated by the first user will be supplied to the switching environment from the usage parameter control device 22 and will be directed to the second user via the DBC 20 and several switches such as switch 12. At the location of the second user, user equipment is provided for the transmission and reception of traffic. Therefore, transmission between users is only in the form of data, with other communication channels being required for the first user to effect communication of voice and video signals via the network.

The broadband switch 12 has a plurality of input ports and a plurality of output ports. Thus, output signals from a user are supplied to an input port 70 of the broadband switch 12, and the switch is arranged to supply cells received at that port to an output port 72, which in turn directs the cells via similar switching devices to the second user. Similarly, output cells from the second user are ultimately supplied to the broadband switch 12 at an input port 74, allowing the switch 12 to direct the cells to an output port 76.

The establishment of logical paths within the broadband switch 12 is effected by a network management computer 78, which is also responsible for overseeing the operation of a plurality or similar broadband switches.

Communication between the network management computer 78 and the broadband switch 12 is made via a respective element manager 80, which is switch-specific and provides an interface between the switch and the network management computer. Thus proprietary broadband switches from a plurality of manufacturers may be configured within an overall network interfaced via respective element managers 80.

Traffic control of the broadband switch 12 is effected via a call controller 82. Thus, it is necessary for the call controller 82 to receive information defining the bandwidth requirement for any particular logical connection, thereby ensuring that suitable operation of the broadband switch 12 is made under the control of the call controller, so as to minimise cell loss. The arrangement should be configured such that cells identified as being of a high priority are never lost, and low priority cells are only lost when the broadband switch 12 is overloaded when congested.

The network includes usage parameter control devices 22, which conform to the operations defined within Recommendation I 371. Thus, a usage parameter control device 22 is provided for each user, and is programmed in accordance with the required level of service required by the user. Thus, a user's usage contract will specify a first traffic threshold, below which, all cells identified as being a high priority will remain at this priority, thereby ensuring their successful transmission through the network. However, once traffic exceeds the first threshold, some cells will have their priority downgraded to low priority, such that it cannot be guaranteed that transmission will successfully take place through the network. Thus, a user will have a guaranteed bandwidth, beyond which traffic may be accepted, but transmission through the network cannot be guaranteed.

The usage parameter control device 22 defines a second traffic threshold, beyond which cells will be removed from the data stream altogether, thereby ensuring that the bandwidth requirement made of the switch never exceeds, for that particular user, the traffic level defined by the second threshold.

Thus, in normal operation, a user would aim to stay below the first threshold, thereby ensuring that all cells are transmitted through the network. However, if (possibly through some unexpected occurrence) traffic demand increases, the network may have capacity to accommodate this increase in traffic, thereby maintaining data integrity for the customer, while at the same time being provided with a mechanism for removing offending cells, thereby ensuring that cells to which bandwidth has been guaranteed are transmitted through the network.

Thus, within each broadband switch 12 and under the control of the call controller 82, low priority cells may be rejected when congestion occurs. However, as previously stated, the overall network would be configured such that high priority cells would be guaranteed transmission through the network.

In the first preferred embodiment of the invention, a user may remain permanently physically connected to the network, and may be under the impression that the network is permanently configured so as to make bandwidth available, even when the user does not have a requirement to make use of this available bandwidth. However, the user is only charged when an actual use of the network is made, preferably by charging the user on the basis of the number of cells transmitted over the logical link. Thus, prior to transmission being invoked by, the user, the broadband switch 12 may be actually allocating no bandwidth whatsoever for transmission between the input port and the output port. Furthermore, it is not necessary for any special activity to be made by the user in order for bandwidth to be allocated. A level of bandwidth will be assigned to the user when required.

After transmitted cells have passed the usage parameter control device 22, they are directed to a dynamic bandwidth controller 22. It may take a short interval for the call controller 82 to find the required level of bandwidth required by the bandwidth controller 20 so that, during the interval required by call control to process the bandwidth request, all transmitted cells are downgraded to low priority.

In addition to the user generating signals, which, as previously stated, are supplied to the input port 70, signals are also transmitted back to the user via the output port 76. These output signals are also supplied to the dynamic bandwidth controller 20, allowing said controller to transmit signals back to the user. Thus, in particular, the dynamic bandwidth controller 20 may issue a signal back to the user, instructing the user to reduce its data output to avoid the risk of cells being lost.

Figure 14:
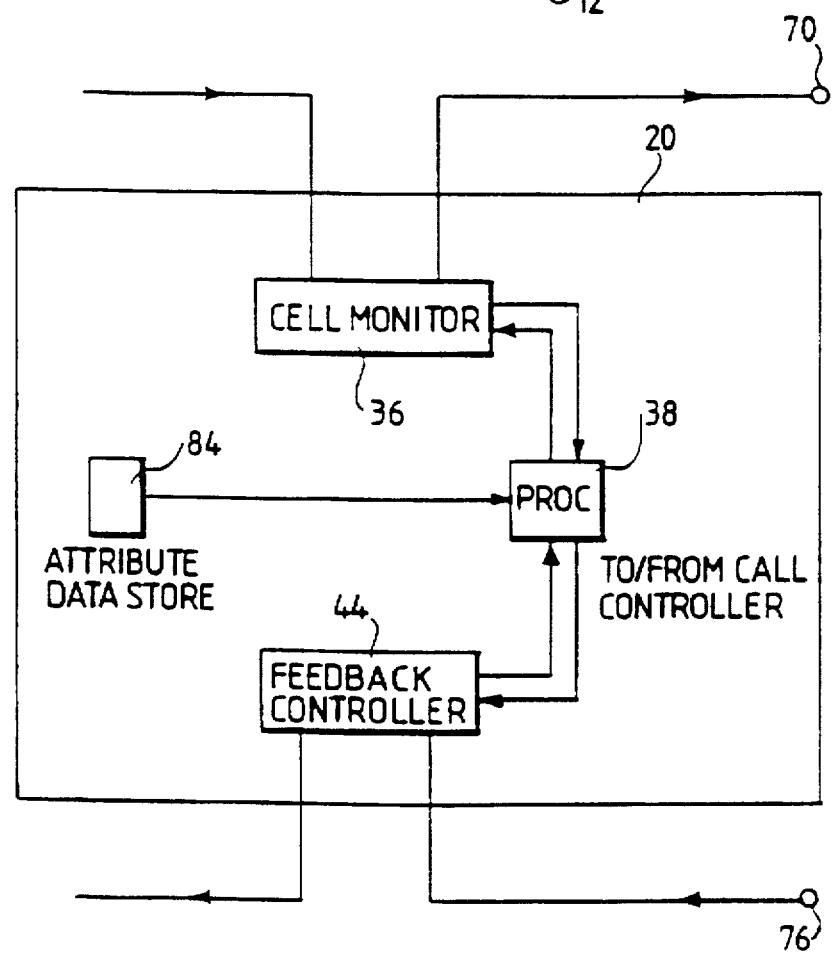
FIG. 14 is a block diagram of the dynamic bandwidth controller of FIG. 13, including a cell monitor.

The dynamic bandwidth controller 20 is shown in more detail in FIG. 14, and includes an activity detector or cell monitor 36, a controller or processor 38, a feedback module 44 and an attribute data store 84.

Data is transmitted to the port 70 and similar data is received from the port 76 in the form of discrete cells, having forty-eight octets of user information plus a five octet header.

As mentioned above the last 8-bit octet of the header is a header error check field which provides a degree of redundancy, by which error checking may be performed on the header information. Thus, the principal reason for providing the header error check field is to ensure that the header information is correct.

Within the cell monitor 36, the header error check field is also used to identify the start of a cell.

In addition to customer originating data being transmitted in the form of cells, it is also possible for the processor 38 to communicate with customer equipment and sub-switching networks within an overall switching environment by generating control information cells.

As previously stated, the usage parameter controller 22, shown in FIG. 13, is capable of modifying the priority of transmitted cells. The traffic thresholds of the usage parameter controller 22 may be adjusted in response to signals received from the network manager 78.

In previous systems, signals would only be supplied to the usage parameter controller 22 when a customer's contract was modified, reflecting a change in the customer's requirement for bandwidth. However, in the present system, the allocation of bandwidth to customers is dynamically controlled so that, in its non-active state, a transmission path having zero bandwidth capacity is effectively allocated for a customer. Thus, in order to reflect this state, an instruction is issued by the network manager 78 to the usage parameter controller 22 setting the first threshold level to zero. Under these conditions, all cells received by the usage parameter controller will be modified to cells of low priority, so that it cannot be guaranteed that the cells will be transmitted through the network. However, during these non-active periods, it is assumed that no demand is being made of the network and that switching capacity may be allocated to other users.

In the preferred embodiment, it is not necessary for a customer to perform any signalling functions in order to initiate a call. The data itself is identified by the dynamic bandwidth controller 22, and triggers the generation of bandwidth requests to the network management or call control.

Referring to FIG. 14, low priority cells, during the initiation of transmission, are supplied to the cell monitor 36 which writes these cells to a first-in-first-out (FIFO) shift register for re-transmission, with minimal delay, to the port 70. The shift register includes outputs which supply values to combinational logic which, as previously described, is capable of identifying cell phase, with reference to the header error check field.

On identifying the presence of cells within its shift register, the cell monitor 36 generates a transmission active signal, which is supplied to the processor 38 along with an indication of the VCI and the VPI associated with the cells being transmitted. In response to this information, the processor 38 will interrogate the attribute data store 84 so as to identify the bandwidth allocation associated with said identifiers. In response to this enquiry, data is supplied back to the processor 38, identifying the bandwidth provision for the particular communication identified by the call monitor 36.

The processor 38 is arranged to configure control cells for transmission to other elements in the network, and in response to the "transmission active" signal generated by the cell monitor 36 and the data read from the attribute data store 84, a message is assembled for transmission to the network manager 78, requesting the establishment of bandwidth within the broadband switch 12, facilitating communication between the input port 70 and the output port 72. In response to this request, the network manager 78 will determine whether this amount of bandwidth is available and, if so, bandwidth is assigned to the connection.

In addition, the network manager 78 also transmits a message to the port 76, for the usage parameter controller 22 which, in response to this message, adjusts its threshold values such that cells are no longer marked as low priority provided that the rate is less than, or equal to, the bandwidth now granted to the connection.

In some situations, a customer may wish to transmit important data where a guarantee is required that the data will be received at its destination. If the terminal transmits a sequence of trial cells all marked as high priority then, under the scenario described above, it can be appreciated that initial cells will have their priority level downgraded by the usage parameter controller 22 until a state has been reached such that bandwidth allocation is guaranteed through the broadband switch 12. Thus, at the receiver, a succession of low priority trial cells may be received prior to the reception of high priority cells, which are only to the reception of high priority cells, which are only transmitted after bandwidth has been granted.

Thus, where a customer requires a guaranteed communication to be established, it is possible for a receiver to examine the status of received cells, and then to issue a signal back to the originating customer when cells of high priority are being received. The receipt of high priority cells will indicate that high priority cells will be maintained and, under this condition, the originating customer may then transmit the high priority data, secure in the knowledge that the priority cells will remain as such throughout the transmission through the network; it only being the initial start up period where cell priority downgrading occurs. Thus, the network automatically responds to a request for bandwidth provision without undergoing an initiation or signalling routine. The trade-off for this functionality is that the priority level of initial cells will be downgraded, and the duration over which this downgrading occurs will depend upon the capacity of the network to establish the bandwidth requirement and thereby issue modifying signal to the relevant usage parameter control devices; therefore, bandwidth provision is guaranteed.

The cell monitor 36 is also capable of detecting the absence of cells passing therethrough. As previously described, provision is made for the identification of cell transmission, and the cell monitor 36 includes a time-out circuit which will ensure that a periodic investigation is made as to whether cells are continuing to be transmitted. When transmission ceases, the cell monitor 36 will effectively time-out and supply a signal to the processor 38 to the effect that transmission has ceased. In response to this signal, the processor 38 will configure a message and transmit this cell to the network manager 78 via the cell monitor 36. In response to this message, the network manger 78 will allow re-allocation of the bandwidth within the broadband switch 12, and issue a message to the usage parameter controller 22, again re-setting the threshold level to zero, such that, on the next iteration, initial cells will have their priority level reset to low priority.

It will be appreciated that many logical connections may be achieved via common physical links. Thus, at a particular input to the overall network, an input port, such as the port 70, may receive cells relating to a plurality of logical connections; and, similarly, the dynamic bandwidth controller 20 will control bandwidth allocation for each of these logical connections.

The allocation of bandwidth has been described for the broadband switch 12 shown in FIG. 13, which is the first broadband switch encountered on entry to the overall network of the type shown in FIG. 1. The bandwidth request made by the dynamic bandwidth controller 20 will also result in interrogations being made of each switch through which the connection passes in order to establish the availability of bandwidth. Thus, provision may have to be made at a plurality of broadband switches, before a message is returned to the dynamic bandwidth controller 20, confirming that bandwidth has been allocated, thereby ensuring that high priority cells are transmitted through the overall network.

As previously stated, the header information is identified by the processor 38 and, in response to this information, attribute data is read from the attribute data store 84, identifying the bandwidth allocated to that particular channel. Thus, for example, the attribute data store 84 may identify the channel as a 1 Mbit/s channel, a 5 Mbit/s channel or a 10 Mbit/s channel etc, depending upon the level of service contracted to the customer.

A further feature provided by the dynamic bandwidth controller 20 is that of allowing a customer access to whatever bandwidth is available at the particular time when a request is made. Thus, when cells arrive from a customer to whom this provision has been made available, an indication is supplied to the processor 38, from the attribute data store 84, to the effect that the cells are to be given whatever bandwidth is available for providing a channel between the two communicating stations.

The processor 38 will construct a message and transmit this cell, identifying the customer's request to the network manager 78. In response to this request, the network manager 78 is required to determine the level of available bandwidth from the communicating source to the communication destination. The available bandwidth over the logical channel will be restricted by whichever physical link has the minimum available bandwidth. Thus, if a communications channel is constructed over three serial physical links, a first of which has 10 Mbit/s available, a second of which has 10 Mbit/s available while a third only has 2 Mbit/s available, the bandwidth available over the combination is only 2 Mbit/s and the remaining 8 Mbit/s at the first and second stages of the link cannot be employed because a bottleneck exists at the station which only has 2 Mbit/s available. Thus, in response to the request made by the processor 38, the network manager 78 will determine the total bandwidth available, and return this information back to the dynamic bandwidth controller 20.

A complication arises when provision is made for allocating whatever bandwidth is available is response to a customer request. At the time the request is made, the requesting customer is not aware what actual level of bandwidth will be available. Furthermore, the network is not aware of the extent to which the requesting customer will require bandwidth. Thus, the network will provide whatever bandwidth is available; and, under some circumstances, this may be insufficient for the customer's requirements. Under these conditions, it is necessary for the network to issue instructions back to the customer, in the form of suitably constructed cells, so as to inform the customer that congestion is imminent, and that action must be taken to reduce the level of traffic supplied to the network.

Cells of this type, instructing a transmitting customer's terminal to reduce its output traffic, are generated by the processor 38 and supplied to the originating terminal via the feedback controller 44. In order to determine whether such a feedback instruction requires to be generated, the cell monitor 36 includes buffers arranged to buffer incoming data of this type, and to generate overflow signals when it is detected that data is being written to the buffers at a faster rate than it is being read from the buffers.

Figure 15:
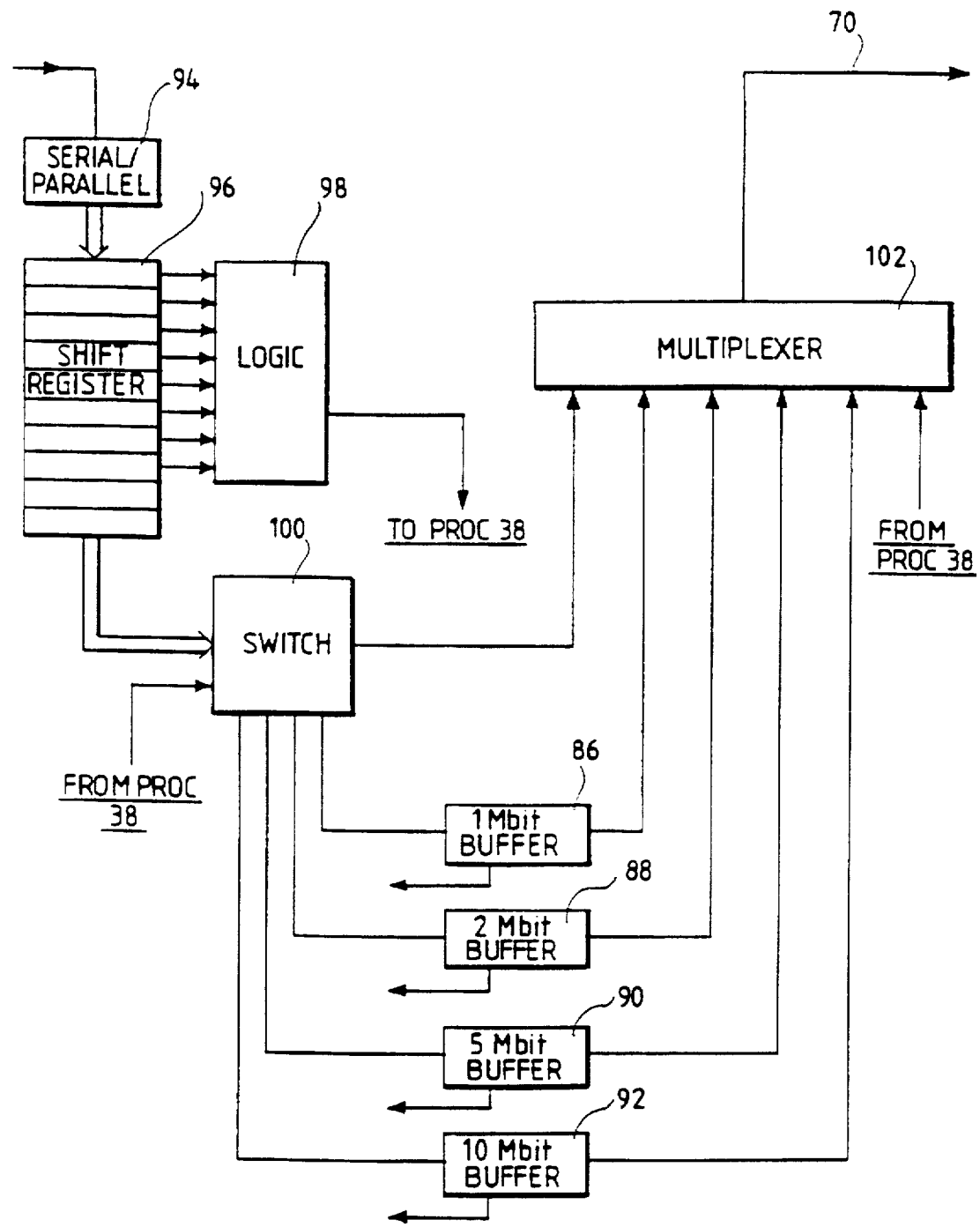
FIG. 15 is a block diagram of the cell monitor of FIG. 14.

The cell monitor 36 of FIG. 14 is shown in more detail in FIG. 15. It should be appreciated that, by its very nature of being capable of transmitting cells in accordance with the available bandwidth, cells of this type will be transmitted at different rates, depending on the bandwidth available when the particular request is made, and that separate buffering devices be provided for each particular rate.

In theory, the level of available bandwidth would be continuously variable and, in response to such a request, any number (within the definition of the system) could be returned to the requesting processor. Under such circumstances, in order to make full advantage of the available bandwidth, it would be necessary to provide buffering devices for every possible transmission rate, or to provide variable rate buffers for each logical channel being transmitted through the system. Each of these alternatives is undesirable.

As shown in FIG. 15, four physical buffers 86, 88, 90 and 92 are provided. The first buffer 86 is arranged to buffer cells being transmitted at 1 Mbit/s, the second buffer 88 is arranged to buffer cells being transmitted at 2 Mbit/s, the third buffer 90 is arranged to buffer cells transmitted at 5 Mbit/s, and the fourth buffer 86 is arranged to buffer cells transmitted at 10 Mbit/s. In practice, the actual number of buffers provided will depend upon operating requirements, as well the actual data rates for which they accommodate cells.

Cells are transmitted from customer equipment and supplied to the port 70 as a serial stream. However, in the cell monitor 36, the serial stream is converted into parallel bit octets by a serial-to-parallel converter 94, which in turn supplies these octets to a parallel shift register 96. The shift register 96 is tapped, allowing a plurality of octets to be read simultaneously by a logic circuit 98 which, as previously described, is arranged to identify the presence of data transmission, the position of headers within cells, and to supply header information to the processor 38. The processor 38 will, in turn, identify the stored bandwidth allocation for the particular cell being transmitted and, in response to this determination, will supply control signals to a switch 100.

If a cell is identified as belonging to a logical communications channel for which the required bandwidth has been specified, the switch 100 is arranged, in response to signals received from the processor 38, to supply cells directly to a multiplexer 102. However, if the cells detected are of the type which will result in a request for "whatever bandwidth is available" to be made available for their transmission, cells supplied to the switch 100 will be directed to one of the buffers 86 to 92, rather than being supplied directly to the multiplexer 102.

After a request has been made by the processor 38 to provide "Whatever bandwidth is available", the network manager 78 will supply information back, in the form of an appropriately addressed message, to the processor 38 identifying the level of bandwidth which is available. When a level of available bandwidth is received by the processor 38, it will not immediately make this bandwidth available for transmission. In preference to making whatever bandwidth is available actually available for transmission purposes, the processor 38 reduces the level of bandwidth available to a level equivalent to the nearest lower value for which a buffer has been provided. Thus, referring to the buffer values provided in FIG. 15, if the available bandwidth comes back as being greater than 10 Mbit/s, the actual bandwidth made available is 10 Mbit/s, and the buffer 92 is used. Similarly, if the available bandwidth is greater than 5 Mbit/s, but less than 10 Mbit/s, 5 Mbit/s is made available and the buffer 90 is used. Similarly, if the actual available bandwidth is between 2 Mbit/s and 5 Mbit/s, the actual allocated bandwidth provision is set to 2 Mbit/s and the buffer 88 is used. Similarly, if the actual bandwidth available is between 1 Mbit/s and 2 Mbit/s, the actual bandwidth allocated is set at 1 Mbit/s, allowing the buffer 86 to be used. Finally, if the actual available bandwidth is less than 1 Mbit/s, it is assumed that no bandwidth is actually available and no provision will be made for facilitating high priority data transmission.

Thus, as described above, the processor 38 will convert the actual level of bandwidth available to one of the processable transmission rates and supply a suitable signal to the switch 100 accordingly. For example, if it is determined that the actual available bandwidth is 3 Mbit/s, a signal identifying this level of provision is supplied to the processor 38 from the network manager 78. In response to this signal, the processor 32 selects one of the processable transmission rates which, in this example, will be 2 Mbit/s, thereby allowing transmission to occur at high priority up to a limit of 2 Mbit/s. A signal is supplied to the switch 100 from the processor 38, thereby directing cells from this link to the buffer 88. The cells are clocked through the 2 Mbit/s buffer 88 in a first-in-first-out fashion, ultimately resulting in said cells being supplied to the multiplexer 102. It should be appreciated that the buffer 88 will also receive 2 Mbit/s cells from other logical links, all of which will be clocked out of that buffer at the appropriate rate. At the multiplexer 102, these cells are combined with cells received from the other buffers and cells received directly from the switch 100 for transmission, during appropriate time slots, to the input port 70. As shown in FIG. 15, the multiplexer 102 is also arranged to receive cells directly from the processor 38 which, as previously described, are required for housekeeping purposes within the switching environment.

Now, to summarise the application of the embodiment described above with reference to FIGS. 13 to 15 within existing networks, a terminal is connected, via a physical link, to a local exchange, which includes interconnection function, control functions for cell processing, management functions for managing resources and usage parameter control functions for policing traffic entering the public network.

All of these functions are common to existing ATM based machines. However, it is proposed that the local exchange includes an additional function which is termed the dynamic bandwidth controller (DBC), which can interact with the management and/or call control functions.

The DBC functions may be summarised as follows:

I. To monitor specific private virtual circuits (PVCS) within the link which connect the terminal to other terminals via interconnection functions and to detect whether traffic activity commences on any PVC.

II. An option of the cell monitor 36 is to set the CLP bits to low priority on all cells of a monitored PVC whenever new activity has been detected and while no bandwidth has been assigned to the PVC other than the default bandwidth. Alternatively, to conform to standards which dictate that the CLP bit shall only be changed by the usage parameter control (UPC), so as to transmit a control message to network management/call control once inactivity has been detected on a PVC, requesting that the UPC parameter is updated, thereby ensuring that all subsequent cells are passed (up to an agreed maximum rate) but are marked as low priority, "violation tagged".

III. When traffic activity is detected on a PVC, to generate signalling messages to the call control function and/or management functions, and to request that the connection attributes are changed, that is, bandwidth is assigned to the PVC which is either a fixed value agreed with the customer for that PVC, or is the highest available bit rate.

IV. To receive signalling messages from the cell control function and/or the management function, acknowledging the "change attribute" request and indicating that bandwidth had been granted for this PVC, if any.

V. To stop overwriting of the CLP with a low priority indication whenever bandwidth has been granted. Alternatively, to conform with standards which state that the CLP bit shall only be modified by the UPC to generate a control message to network management/call control whenever bandwidth has been granted for a PVC, requesting that the UPC parameters are updated, so that cells are passed up to given maximum rate with no modification, ie violation tagging, of the CLP.

VI. To provide feedback control to the terminal, as necessary, to keep the traffic associated with this PVC at a rate which is not greater than can be supported by the granted bandwidth.

VII. To detect when traffic activity ceases for a period of more than n milliseconds and, if this occurs, to generate a signalling message informing the call control function and/or the management function that the connection attributes should be changed, such that zero bandwidth is assigned.

The cell monitor function decides, for each PVC, whether traffic activity has commenced or ceased. Cells transmitted by a terminal, or other PVC end system, are passed to the DBC via an interface. The cell monitor function may include serial-to-parallel conversion of the arriving digital signals, and a shift register to store all or part of the cell header, to facilitate processing of the VPI/VCI and the CLP bit. The cell monitor function includes the capability that it can set the CLP bit to low priority on any cell. However, this can be turned off by the processor function.

Prior to passing the cell onwards towards the network, via an interface, the cell monitor function can perform parallel-to-serial conversion of the digital signals, as required.

The cell monitor function informs the processor function whenever traffic activity has changed on a PVC. The processor function generates appropriate control signals to activate/deactivate the CLP over-writing function within the cell monitor. The CLP over-writing function is activated on a particular PVC whenever call control or network management informs the processor that no bandwidth is assigned on that PVC. Alternatively, the processor function generates a control signal which is transmitted to request the call control or network management to update the UPC parameter, so that all cells are violation tagged on this PVC. The CLP over-writing function is deactivated on a particular PVC, whenever call control or network management informs the processor that guaranteed bandwidth has been assigned to the PVC. If required, the processor function will also generates a request to call control or network management to the effect that UPC parameters have been changed to stop violation tagging.

The processor function also generates control signals to call control and network management, which request bandwidth changes to the PVC. Bandwidth request and acknowledge signals are sent and received via an interface. The correct generation of these signals by the processor relies on data stored in the PVC attributes data store, which contains information on the amount of guaranteed bandwidth required or whether any available bit rate can be assigned up to a given maximum value and above a given minimum value.

Cells which travel in the opposite direction towards the terminal are passed to a DBC feedback function via an interface. The purpose of this function is to instruct terminals to stop or transmit at any speed which does not infringe the peak rate or sustained cell rate specified in traffic contract monitored by the UPC. The feedback function may pass these signals back to the terminal either by modifying the genetic flow control (GFC) field of any cell header or by inserting a control cell in place of an unassigned cell, when this arrives.

The feedback function may include serial-to-parallel conversion of the arriving digital signals, and a shift register is provided to allow the processing of cell headers and parallel-to-serial conversion of output digital signals.

The processor function informs the feedback function of the correct rate at which to apply feedback signals to the terminals. No feedback signals are required to be generated when the customer has requested that a fixed bandwidth is to be assigned, rather than any available bit rate. In this case, it is assumed that the terminal always transmits at the fixed rate, which is monitored by the UPC. Therefore, no further control function is required to keep the terminal transmitting at the correct rate.

However, for customers who have requested that any available bit rate should be assigned to the PVC, between given minimum and maximum values, it is assumed that the UPC only checks that the maximum has not been exceeded.

Cells from available bit rate PVCs, when arriving at the DBC, are routed internally to one of several buffers within the cell monitor function. The cells from fixed bit rate PVCs need not be routed by any buffer, since no additional bit rate checks are necessary, other than as provided by the UPC, in which case there are two distinct delay characteristics. Firstly, fixed bit rate PVCs carrying bursty traffic with low delay, suitable for variable bit rate video and, secondly, available bit rate PVCs carrying bursty traffic with a large buffer delay, suitable for data which is not delay-sensitive.

The buffers within the cell monitor function are each associated with a traffic class, based upon an output bit rate. All available bit rate PVCs are assigned to one of these classes, based on the bandwidth granted by the call control and network management.

When requesting any available bit rate for a PVC, the DBC may either supply the acceptable class rates as parameters of the request, or start with a request for the highest class rate acceptable for the PVC, as stored in the PVC attribute data store and, if call control or network management does not grant that request, a second request is generated for the lowest class rate acceptable for the PVC. If this request is granted, no further requests are made, and the PVC is assigned to that class. Until an available bit rate PVC is assigned to a class, no cells are diverted to any buffer, and all cells are marked with low priority. Furthermore, cells arriving at the DBC which are not diverted to a buffer, either from fixed bit rate PVCs or from available bit rate PVCs, which have not yet been granted any bandwidth, have priority over cells in a transmit buffer. A transmit buffer is a common buffer to which cells are transferred from class buffers, prior to output.

This rule of transmission priority is necessary to ensure cell sequence integrity of available bit rate PVCs and to ensure that fixed bit rate PVCs have minimum delay. To understand the cell sequence integrity guarantee for available bit rate PVCs, it is clear that, if the first R cells are transmitted prior to bandwidth being guaranteed, and if cell R+1 and all remaining cells (until inactivity is detected) are diverted to a class buffer then, because of the priority transmission rule above, cell R+1 cannot be transmitted before the Rth cells.

If n PVCs are in the 2 Mbit/s class, cells are transmitted to the transmit buffer at a rate of n times 2 Mbit/s. This ensures that available bit rate PVCs conform to the rate expected by the network. If the terminal is transmitting faster than this rate, the effect will be that the class buffer begins to fill, but there will be additional unexpected traffic entering the network beyond the DBC.

The cell monitor functions provides an indication to the processor function whenever a class buffer has been filled above a pre-assigned threshold, or when it has been filled below another pre-determined threshold. When the processor function receives an indication that a class buffer is filled above said first threshold, it instructs the feedback function to deliver "stop transmitting" signals to the appropriate terminals. The PVCs identities of the appropriate terminals are passed to the feedback function from the processor function, and the feedback function may then insert a series of control cells with the same PVC values which instruct all those terminals to stop. Alternatively, it may stop all PVCs using GFC, if there is a large number of PVCs to stop, for example, if there is only a small number of different classes.

When the processor function receives an indication that a class buffer is filled below the second threshold, it instructs the feedback function that the cell transmission can start again on those PVCs. In this case, the feedback function will no longer transmit control cells to those PVCs or said function will change the GFC setting if it was controlling a large number of PVCs.

What is claimed is:

1. A broadband switching system having at least one ingress for connection to a respective signal source and at least one egress for connection to a selected signal receiving system, the switching system comprising:

at least one switch for transmitting information-carrying asynchronously transferred data cells from the ingress to the egress, system control means for accepting and establishing a connection between the ingress and the egress via the said switch, and bandwidth control means arranged to detect the said information-carrying data cells received at the ingress and, automatically in response to such data cell detection, to cause the system control means to allocate bandwidth for the transmission of the data cells to the egress.

2. A system as in claim 1 wherein the system control means includes: means for identifying available bandwidth for the said allocation of bandwidth.

3. A system as in claim 2 wherein the bandwidth control means includes:
means operable to receive from the means for identifying a control signal representing the available bandwidth.

4. A system as in claim 2 wherein:
the system control means includes a congestion sensor for transmitting a congestion signal to the bandwidth control means, and
the bandwidth control means includes feedback means for transmitting a reduce-traffic-level instruction to the ingress for the signal source.

5. A system as in claim 1 wherein, the bandwidth control means include:
a transmission limiter having storage means for storing a maximum output data cell rate value derived from a control signal received by the limiter from the system control means, and
means for limiting the transmission of data cells to the said switch when the rate at which data cells are received at the ingress exceeds the maximum output data cell rate value.

6. A system as in claim 5 wherein:
the transmission limiter includes a buffer for delaying transmission of data cells to the switch.

7. A system as in claim 5 wherein the bandwidth control means include:
feedback means arranged to transmit the maximum output data cell rate value to the ingress for transmission to a signal source generating the data cells.

8. A system as in claim 5 wherein:
the ingress is arranged to receive data cells from a plurality of signal sources and
the transmission limiter is operable to transmit data cells from one of the sources at a rate which is dependent on the number of data cells from one or more of the other sources stored by the device.

9. A system as in claim 1, wherein:
the ingress is arranged to receive data cells from a plurality of signal sources,
the bandwidth control means include a data cell monitoring stage operable to read routing identifiers associated with the data cells and to update activity status values associated with the routing identifiers, and
the transition of an activity status value relating to a said identifier from an inactive to an active status causes the system control means to allocate bandwidth for data cells associated with the said identifier.

10. A system as in claim 1 wherein:
the bandwidth control means are arranged to detect the rate at which data cells are supplied to the ingress.

11. A system as in claim 10 wherein:
the bandwidth control means are arranged such that if the allocated bandwidth is more than that required to transmit the data cells at the monitored rate, the system control means are caused to allocate less bandwidth to the data cells.

12. A system as in claim 1 wherein:
the bandwidth control means are arranged to read a bandwidth-identifying portion of the incoming data cells and to cause the system control means to allocate bandwidth to the data cells according to the bandwidth identified by the said portion.

13. A system as in claim 1 wherein:
the bandwidth control means are arranged to limit the rate at which the incoming data cells are accepted onto the system according to a default bandwidth until allocation of bandwidth to the said incoming data cells by the system control means has occurred.

14. A system as in claim 13 wherein the bandwidth control means include:
means for assigning a low priority status to the said incoming data cells while no bandwidth has been allocated to the data cells other than the said default bandwidth.

15. A system as in claim 1 wherein:
the bandwidth control means include a data cell counter for counting data cells received from respective signal sources coupled to the bandwidth control means thereby to generate charging signals for customer billing.

16. A system as in claim 6 wherein:
the buffer has means for detecting filling of the buffer to a predetermined threshold level, and
the feedback means are responsive to the buffer to cause a re-transmission of the maximum output data cell rate value for the associated signal source when connected to the ingress when the buffer has been filled to the threshold level.

17. In a broadband switching system for the transmission of information-carrying asynchronously transferred data cells from an ingress of the system to an egress of the system, the improvement comprising:
bandwidth control means arranged to detect incoming data cells received at the ingress, and
system control means for automatically, in response to such data cell detection, causing allocation of bandwidth for the transmission of the data cells to the egress.

18. A method of operating a broadband switching system for transmitting information-carrying asynchronously transferred data cells from an ingress of the system to an egress of the system via at least one switch, the method comprising:
controlling the bandwidth for transmitting the data cells by detecting the data cells and,
automatically in response to the detection, causing system control means of the system to allocate bandwidth for transmission of the data cells from the ingress to the egress.

19. A method as in claim 18 wherein:
the allocation of bandwidth is preceded by identification of available bandwidth, and
congestion is signalled to the ingress to cause a reduction in input traffic level.

20. A method as in claim 18 including:
storing a maximum output data cell rate value derived from a control signal received from the system control means, and
limiting the transmission of data cells to the said switch when the rate at which data cells are received at the ingress exceeds the maximum output data cell rate value.

21. A method as in claim 20 wherein:
the limiting step includes delaying transmission of data cells to the switch in a buffer.

29

22. A method as in claim 20 wherein:
the maximum output data cell rate value is transmitted to a signal source generating the data cells as a feedback signal.

23. A method as in claim 20 including:
receiving data cells from a plurality of signal sources, and
wherein the limiting step includes transmitting data cells received from one of the sources at a rate which is dependent on the number of cells received from one or more of the other sources.

24. A method as in claim 18 including:
receiving data cells from a plurality of signal sources, and monitoring the incoming data cells by reading routing identifiers associated with the data cells and updating activity status values associated with the routing identifiers, and
causing the system control means to allocate bandwidth for data cells associated with a said identifier upon the transition of an activity status value relating to the said identifier from an active to an inactive status.

25. A method as in claim 18 wherein:
the detecting step includes detecting the rate at which data cells are supplied to the ingress from an identified signal source.

26. A method as in claim 25 wherein:
if the allocated bandwidth is more than that required to transmit the data cells at the detected rate, the system control means are caused to allocate less bandwidth to the data cells.

27. A method as in claim 18 including:
reading a bandwidth-identifying portion of the incoming data cells, and
causing the system control means to allocate bandwidth to the data cells according to the bandwidth identified by the said portion.

28. A method as in claim 18 including: limiting the rate at which incoming data cells are accepted onto the network according to a default bandwidth until allocation of bandwidth to the said incoming data cells by the system control means has occurred.

29. A method as in claim 18 including: counting data cells received from respective signal sources thereby to generate charging signals for customer billing.

30. A method as in claim 21 wherein:
the maximum output data cell rate value is transmitted to a signal source generating the data cells as a feedback signal, and
the filling of a buffer to a predetermined threshold level is detected and, in response to reaching the said predetermined threshold level, retransmission of the maximum output data cell rate value for the associated signal source is caused to occur when the buffer has been filled to the threshold level.

31. A dynamic bandwidth controller for a broadband switching system, which system is for transmitting information-carrying asynchronously transferred data cells from an ingress of the system to an egress of the system via at least one switch, wherein the controller comprises:
means for detecting the said data cells received at the ingress, and
means for issuing a bandwidth request signal automatically in response to such data cell detection to cause bandwidth to be allocated in the system for the transmission of the data cells to the egress.

30

32. A controller as in claim 31 arranged to allow data cells to pass through the system while the bandwidth request is being processed in the system and before the said allocation of bandwidth.

33. A controller as in claim 31 including transmission limiting means arranged to store a data cell rate indicator value in response to a system control signal, and to limit the onward transmission of data cells when the rate at which data cells are received at the ingress exceeds a data cell rate indicated by the data cell rate indicator signal.

34. A system as in claim 1 arranged such that the transmission of the said data cells to the egress may be performed without requiring a prior bandwidth request signal at the ingress.

35. An improvement as in claim 17 arranged such that the transmission of the said data cells to the egress may be performed without requiring a prior bandwidth request signal at the ingress.

36. A method as in claim 18 wherein transmission of the data cells to the egress may be performed without requiring a prior bandwidth request signal at the ingress.

37. A controller as in claim 31 arranged such that data cells may be transmitted to the egress without requiring a prior bandwidth request signal at the ingress.

38. A broadband switching system comprising:
at least one ingress for connection to a respective signal source,
at least one egress for connection to a selected signal receiving system,
at least one switch for transmitting information-carrying data cells from the ingress to the egress,
system control means for accepting and establishing a connection between the ingress and the egress via the said switch, and
bandwidth control means arranged to detect a newly active source of the said information-carrying data cells and operable with the system control means to automatically allocate bandwidth for transmission of the data cells through the system without requiring a prior bandwidth request signal from the source.

39. A system as in claim 38, wherein:
the bandwidth control means include an activity detector for detecting a newly active signal source transmitting the said data cells, and in response to the said detection, causing immediate allocation of at least a default cell rate for transmission of the data cells, thereby to avoid rejection of any newly active source.

40. A method of operating a broadband switching system for transmitting information-carrying asynchronously transferred data cells from an ingress of the system to an egress of the system via at least one switch, the method comprising:
controlling the bandwidth for transmitting the data cells,
the controlling step including detecting a newly active source of the said data cells and, automatically in response to such detection and without requiring a prior bandwidth requesting signal from the source, causing the system to allocate bandwidth for transmission of data cells from the source through the system to the egress.

41. A method as in claim 40 wherein bandwidth allocation for a newly active source comprises the immediate allocation of at least a default data cell rate for transmission of the data cells, thereby to avoid rejection of any newly active source.

* * * * *

UNITED STATES PATENT AND TRADEMARK OFFICE
CERTIFICATE OF CORRECTION

PATENT NO. : 5,784,358
DATED : July 21, 1998
INVENTOR(S) : Smith, et. al.

It is certified that error appears in the above-identified patent and that said Letters Patent is hereby corrected as shown below:

Title page, item [75], inventors: change "Avail Joy Smith" to -- Avril Joy Smith--.

Signed and Sealed this

Ninth Day of March, 1999

Attest:

Attesting Officer

Q. TODD DICKINSON

Acting Commissioner of Patents and Trademarks